United States Patent
Kobayashi et al.

(10) Patent No.: US 9,053,262 B2
(45) Date of Patent: Jun. 9, 2015

(54) METHOD OF DETERMINING REINFORCEMENT POSITION OF CIRCUIT SUBSTRATE AND SUBSTRATE ASSEMBLY

(71) Applicant: FUJITSU LIMITED, Kawasaki-shi (JP)

(72) Inventors: Hiroshi Kobayashi, Kawasaki (JP); Satoshi Emoto, Nagano (JP); Toru Okada, Yokohama (JP); Masayuki Kitajima, Yokohama (JP); Takumi Masuyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 13/648,335

(22) Filed: Oct. 10, 2012

(65) Prior Publication Data
US 2013/0128477 A1 May 23, 2013

(30) Foreign Application Priority Data
Nov. 22, 2011 (JP) .................................. 2011-255535

(51) Int. Cl.
G06F 17/50 (2006.01)
H01L 23/00 (2006.01)
H05K 3/00 (2006.01)
H05K 1/02 (2006.01)

(52) U.S. Cl.
CPC ............ *G06F 17/5009* (2013.01); *H01L 24/10* (2013.01); *H05K 1/0271* (2013.01); *H05K 3/0005* (2013.01); *G06F 17/5086* (2013.01)

(58) Field of Classification Search
CPC ......... H01L 23/00; H01L 21/71; H01L 23/02; H01L 23/3128; H01L 24/10; H01L 24/12; H01L 24/01; H01L 23/4952; H01L 23/49811; H01L 23/49816; H05K 1/16; H05K 7/00; H05K 7/14; H05K 7/02; H05K 1/0271; H04N 5/64; G06F 17/5009

USPC ..................... 703/13; 257/629, 678; 174/260; 361/760, 759; 348/836
See application file for complete search history.

(56) References Cited

U.S. PATENT DOCUMENTS 7,579,693 B2 8/2009 Saito
2001/0015889 A1* 8/2001 Nariyama ..................... 361/759
(Continued)

FOREIGN PATENT DOCUMENTS

JP        11-40687       2/1999
JP      2005-294727     10/2005
(Continued)

OTHER PUBLICATIONS

Fan et al., "Multi-physics modeling in virtual prototyping of electronic packages—combined thermal, thermo-mechanical and vapor pressure modeling", Microelectronics Reliability, 2004.*
(Continued)

*Primary Examiner* — Kandasamy Thangavelu
(74) *Attorney, Agent, or Firm* — Fujitsu Patent Center

(57) ABSTRACT

A method of determining a reinforcement position of a circuit board includes: setting a numerical model of a circuit board in which an electronic component is mounted in a front surface by bumps, and a reinforcing member is attached to a position corresponding to a bump located in a corner part of the electrical component in a back surface; incorporating information about a stud that is located in a periphery of the electronic component and fixes the circuit board to a chassis of the electronic device; performing a simulation for obtaining values of stresses generated in bumps of corner parts when a force is applied to the electronic component from a back side of the circuit board; and determining an arrangement of the reinforcing member in accordance with a position of the stud based on the values of stresses obtained by the simulation.

3 Claims, 28 Drawing Sheets

(56) References Cited

U.S. PATENT DOCUMENTS

| | | | | |
|---|---|---|---|---|
| 2007/0063324 | A1* | 3/2007 | Mishiro et al. | 257/678 |
| 2009/0168379 | A1* | 7/2009 | Maehara et al. | 361/760 |
| 2010/0018759 | A1* | 1/2010 | Oe | 174/260 |
| 2011/0006405 | A1* | 1/2011 | Yamamoto et al. | 257/629 |
| 2011/0303441 | A1 | 12/2011 | Kobayashi et al. | |
| 2012/0236214 | A1* | 9/2012 | Takeguchi et al. | 348/836 |

FOREIGN PATENT DOCUMENTS

| | | |
|---|---|---|
| JP | 2007-12695 | 1/2007 |
| JP | 2007-88293 | 4/2007 |
| JP | 2011-18677 | 1/2011 |
| JP | 2011-258836 | 12/2011 |

OTHER PUBLICATIONS

Lindsey et al., "JACS-Pak™ Flip-Chip Chip Scale Package Development and Characterization", IEEE 1998.*

Wright, W.L., "Processing of NITI reinforced adaptive solder for electronic packaging", Naval Postgraduate School, Monterey, California, 2004.*

Bandaram, A., "Reliability of Solder Attachment Options with Lead Free for 0.4 mm Micro BGA Packages", Auburn University, Aug. 6, 2011.*

* cited by examiner

METHOD OF DETERMINING REINFORCEMENT POSITION OF CIRCUIT SUBSTRATE AND SUBSTRATE ASSEMBLY

CROSS-REFERENCE TO RELATED APPLICATION

This application is based upon and claims the benefit of priority of the prior Japanese Patent Application No. 2011-255535, filed on Nov. 22, 2011, the entire contents of which are incorporated herein by reference.

FIELD

A certain aspect of embodiments described herein relates to a method of determining a reinforcement position of a circuit board, and a substrate assembly.

BACKGROUND

When an electronic component is mounted on a substrate, a flip-chip mounting is conducted by using bumps. At this time, bumps have a function of obtaining an electrical connection between the electronic component and the circuit board, and mechanically fixing the electronic component to the circuit board. In addition, the underfill is provided between bumps, and the junction of the electronic component with the circuit board is reinforced. Reinforcement is disclosed in, for example, Japanese Laid-Open Patent Publication Nos. 2007-88293 and 2007-12695.

However, when the underfill is used, there is a case where it becomes difficult to remove components. If it is impossible to remove components, the use of the whole of a circuit board to which an expensive component is mounted becomes impossible.

SUMMARY

According to an aspect of the present invention, there is provided a method of determining a reinforcement position of a circuit board including: setting a numerical model of a circuit board in which an electronic component is mounted in a front surface by bumps, and a reinforcing member is attached to a position corresponding to a bump located in a corner part of the electrical component in a back surface; incorporating information about a stud that is located in a periphery of the electronic component and fixes the circuit board to a chassis of the electronic device; performing a simulation for obtaining values of stresses generated in bumps of corner parts when a force is applied to the electronic component from a back side of the circuit board; and determining an arrangement of the reinforcing member in accordance with a position of the stud based on the values of stresses obtained by the simulation.

According to an aspect of the present invention, there is provided a substrate assembly fixed to a chassis, the substrate assembly including: a circuit board to which an electronic component is mounted by bumps arranged in a rectangular shape on a front surface; a stud that is located in a periphery of the electronic component and fixes the circuit board to the chassis; and a reinforcing member attached to a position corresponding to a part of corner parts of the electronic component in a back surface of the circuit board, wherein when a position of a center of the electronic component is located on a line connecting the stud and the reinforcing member, the reinforcing member is located in a position corresponding to a corner part other than a corner part of which a stress generated when a stress is applied to the electronic component from a back side of the circuit board is smallest.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6A is a cross-sectional view, and FIG. 6B is a plain view;

DESCRIPTION OF EMBODIMENTS

As described previously, when the underfill is used, there is a case where it becomes difficult to remove components. Thus, there has been increased bump mounting an electronic component on a circuit board without using the underfill. However, when the underfill is not used, there is a case where a mechanical strength is not ensured sufficiently, and in that case, a countermeasure to compensate for the mechanical strength becomes necessary. For example, there has been proposed bonding a warpage reduction member by solder to the rear side of a circuit board on which semiconductor devices are mounted in order to reinforce parts to which the semiconductor devices are mounted.

The objective of the above described warpage reduction member is to suppress the warpage of the circuit board caused by the heat generated in soldering, operation and the like. However, the cause of the warpage of the circuit board is not limited to such a heat generation. In addition to the heat generation, the warpage also occurs when a pressure from the outside (an external force) is applied. In this case, a warpage state of the circuit board depends on the degree of fixed state of the circuit board to the chassis.

In recent years, in small electronic devices such as mobile phones, very high-density mounting of components is required. In such devices, it is required to use the minimum necessary number of warpage reduction members, and to secure a region in which components are mounted on the circuit board. That is to say, the highest priority is to secure a large region in which components are mounted on the circuit board. Thus, a flexible designing, for example, determining a minimum arrangement of warpage reduction members and then determining positions of studs fixing the circuit board to the chassis, is required.

However, as it is generally difficult to examine what kind of countermeasure to reduce the warpage becomes necessary in accordance with positions of studs, the flexible designing is difficult.

Hereinafter, a description will be given of an embodiment of the present invention with reference to attached drawings. However, for convenience of illustration, in drawings, the size, the ratio and the like of each portion may be not illustrated to correspond to those of actual portions completely. For example, the number of bumps illustrated in drawings is different from actual one.

Figure 1:
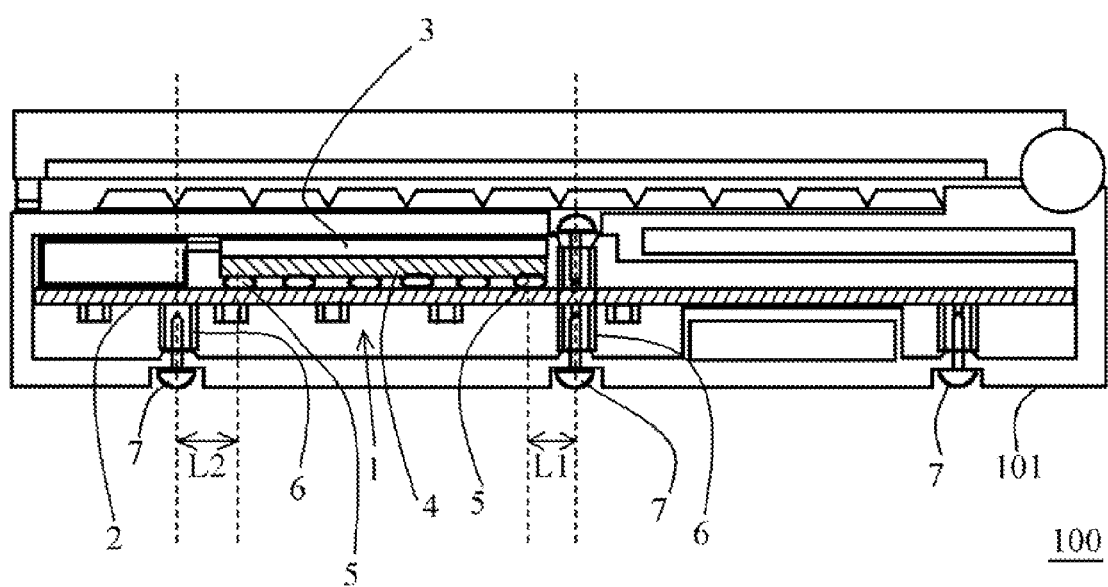
FIG. 1 is a cross-sectional view of an electronic device in which a substrate assembly is incorporated.
Figure 4:
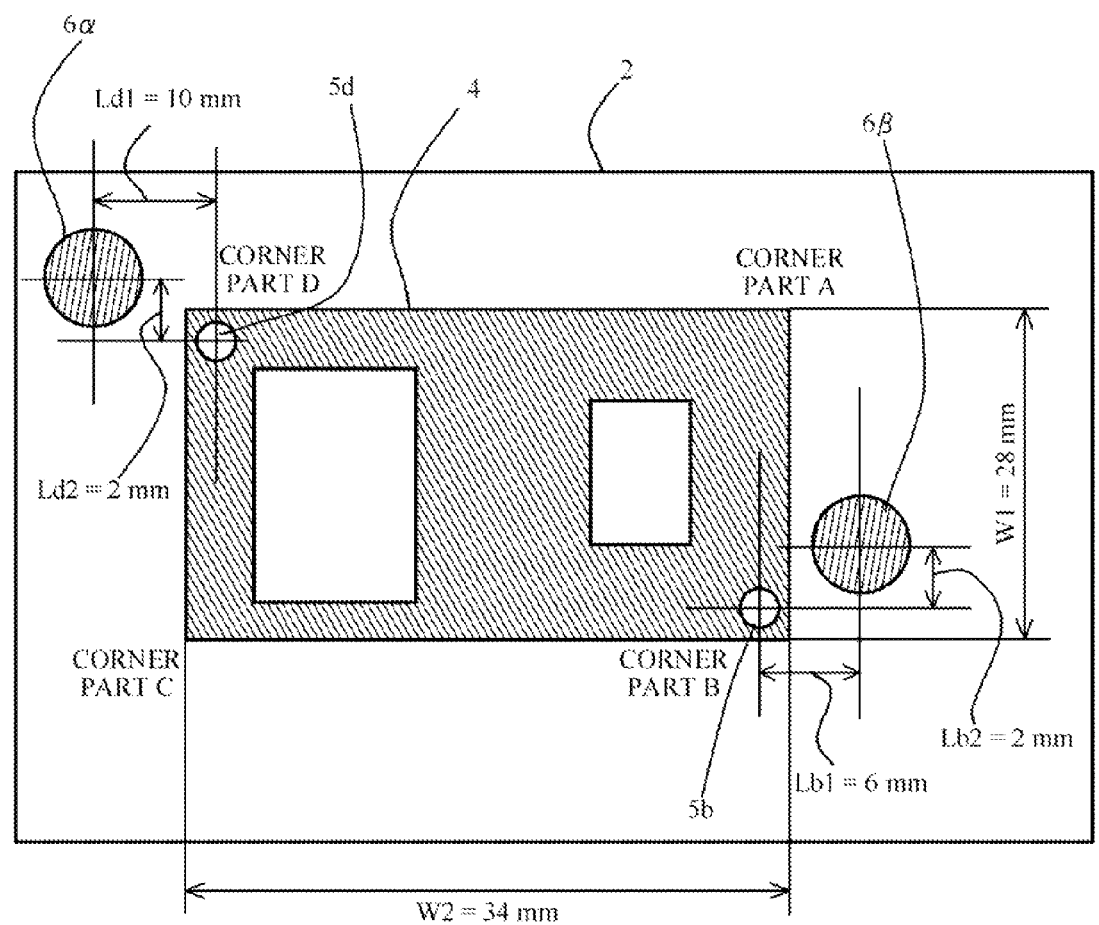
FIG. 4 is an explanatory diagram illustrating a size of each part of a circuit board of the embodiment.

With reference to FIG. 1, a description will be given of an outline structure of an electronic device including a substrate assembly 1. An electronic device 100 is assumed to be a personal computer which is an example of portable electronic devices, but may be other devices such as a portable phone. The electronic device 100 includes the substrate assembly 1 inside a chassis 101. The substrate assembly 1 includes a circuit board 2 to which an electronic component 4 is mounted. In the present embodiment, the electronic component is assumed to be a BGA (Ball grid array) type package CPU (Central Processing Unit), but other electronic components may be used. A heat release member 3 is stacked and provided on the electronic component 4. The electronic component 4 is flip-chip mounted on the circuit board 2 via bumps (solder bumps) 5. The bumps 5 are arranged in a rectangular shape as illustrated in FIG. 4 and other drawings. A part of the periphery of the circuit board 2 is sandwiched and held by the chassis 101, and fixed by screws 7 via studs 6 at multiple positions. The studs 6 are located in the periphery of the electronic component 4. The studs 6 are used for fixing the electronic device of the circuit board 2 to the chassis 101. As described above, a part sandwiched and held by the chassis 101 and a part fixed by the studs 6 become fixed parts of the circuit board 2. The electronic component 4 has a rectangular shape, and has four corner parts. That is to say, as illustrated in FIG. 4 and other drawings, four corner parts: a corner part A, a corner part B, a corner part C and a corner part D; are formed in the electronic component 4. The circuit board 2 has a flexibility, and the electronic component 4 can be considered as a rigid body.

Figure 2:
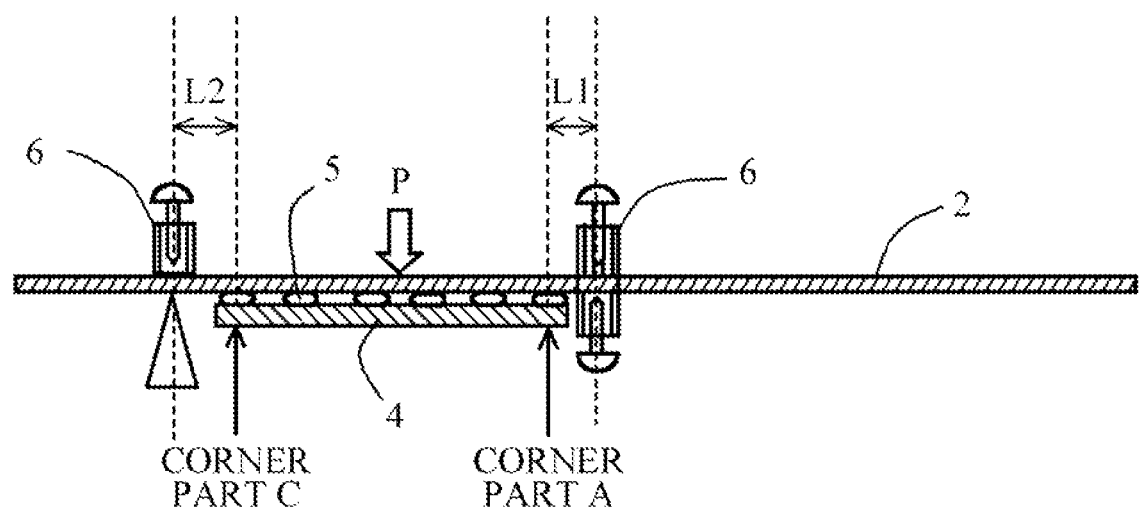
FIG. 2 is an explanatory diagram illustrating a stress generated in the substrate assembly.

FIG. 2 is an explanatory diagram illustrating a stress generated in the substrate assembly 1. A distance from the corner part A of the electronic component 4 to the stud 6 that becomes a fixed part closest to the corner part A is expressed by L1. A distance from the corner part C to the stud 6 that becomes a fixed part closest to the corner part C is expressed by L2. Then, it is assumed that a load P is applied to the electronic component 4. At this time, a moment $M_A$ generated in the corner part A and a moment $M_C$ generated in the corner part C are expressed by following formulas.

$$M_A = L1 * P/2$$

$$M_C = L2 * P/2$$

Thus, the ratio of moments follows the ratio of L1 to L2. That is to say, for example, when the ratio of L1 to L2 is 1:2, the ratio of moments becomes 1:2. A relation between the moment and a stress value is expressed by a following formula by using Z as a section modulus.

$$\sigma = M/Z$$

Assuming that a thickness of the electronic component 4 is h and a width is b, the section modulus Z is expressed by a following formula.

$$Z = bh^2/6$$

Therefore, values of stresses generated in the corner part A and the corner part C depend on distances L1 and L2 from the position, to which the load P is applied, to the fixed part. As described above, the degree of warpage varies based on the distance between each corner part of the electronic component 4 and the fixed part, and stresses generated in the bumps 5 of corner parts vary. Thus, the arrangement of the studs 6 affects on the degree of warpage of the substrate assembly 1, and stress values. The substrate assembly 1 of the present embodiment equalizes stress values, and makes them as uniform as possible.

Depending on a positional relation between the fixed part such as the stud 6 and the electronic component 4, there is a case where it is impossible to determine a proper reinforcement position by only the evaluation of the moment simply because of the existence of the torsion element. Even in such a case, according to a method described hereinafter, a proper position is reinforced, and an equalization of stresses generated in corner parts is achieved.

A numerical model that takes into consideration the position of the circuit board 2, to which the load P is applied, and the corner part to be reinforced is set. The numerical model includes information about the length, width and thickness of the electronic component 4 mounted on the circuit board 2. In addition, the numerical model includes information about mechanical properties such as a strength of the circuit board 2. Such the numerical model takes into consideration information about the studs 6, that is to say, information about how the studs 6 are arranged in the periphery of the circuit board 2.

A description will now be given of a method of determining a reinforcement position of the circuit board performed when manufacturing the substrate assembly 1 illustrated in FIG. 4. The simulation is performed by the TEG (Test element group) evaluation. A size of an electronic component (BGA package) 14 that is included in the substrate assembly 1 and forms the circuit board 2 is W1×W2=28 mm×34 mm, and distances between a center point of a stud 6α and a center point of a bump 5d located in the corner part D are Ld1=10 mm and Ld2=2 mm. Distances between the center point of a stud 6β and a center point of a bump 5b located in the corner part B are Lb1=6 mm and Lb2=2 mm. The average diameter of bumps is 0.5 mm, and the average height of bumps is 0.4 mm. In addition, 40 N is applied to a center area of the electronic component 4 from a back side of the electronic component 4 (the circuit board 2 side).

A description will now be given of a flow of determining a reinforcement position of the circuit board performed when manufacturing the above-described substrate assembly 1 with reference to flowcharts illustrated in FIGS. 5A and 5B. It becomes possible to specify a part to be reinforced in advance as a countermeasure to reduce the warpage, and to incorporate it into information for design as information of components. In the method of determining a reinforcement position of a circuit board of the present embodiment, the positional relation between the electronic component 4 to be reinforced as a countermeasure to reduce the warpage and a fixed part such as a stud located in the periphery of the electronic component 4 is an important element.

Figure 3:
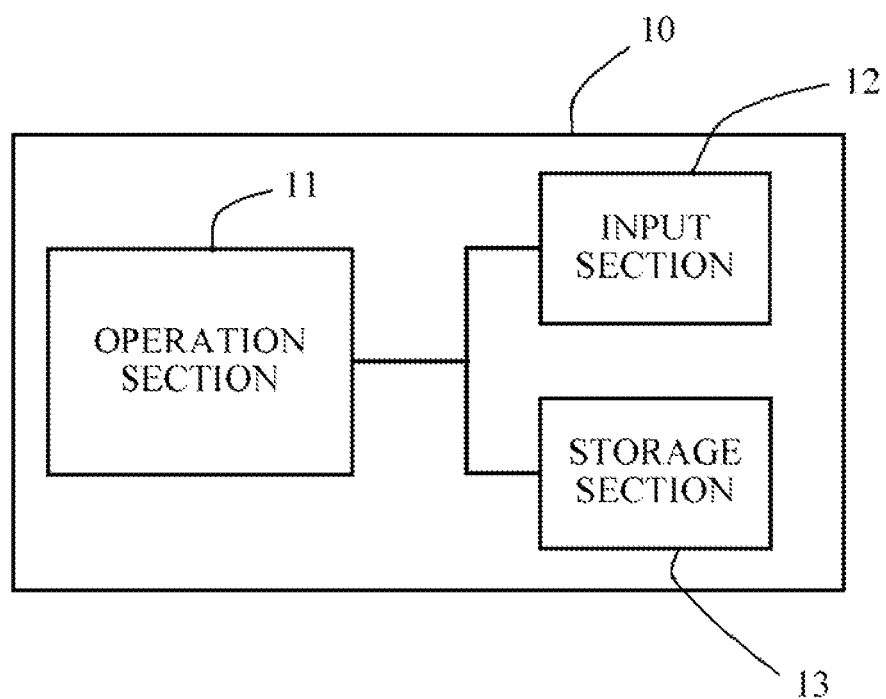
FIG. 3 is a block diagram illustrating an information processing device used in a method of determining a reinforcement position in accordance with an embodiment.

The method of determining a reinforcement position of a circuit board is performed by conducting a simulation using a numerical model with an information processing device 10 of which a block diagram is illustrated in FIG. 3. The information processing device 10 includes an operation section 11, an input section 12 and a storage section 13. The simulation means, more specifically, "performing a simulation to verify stresses applied to the bumps 5 of four corners of the electronic component due to the deformation of the circuit board when a predetermined stress is applied to the electronic component from the back side of the wiring substrate".

Figure 5A:
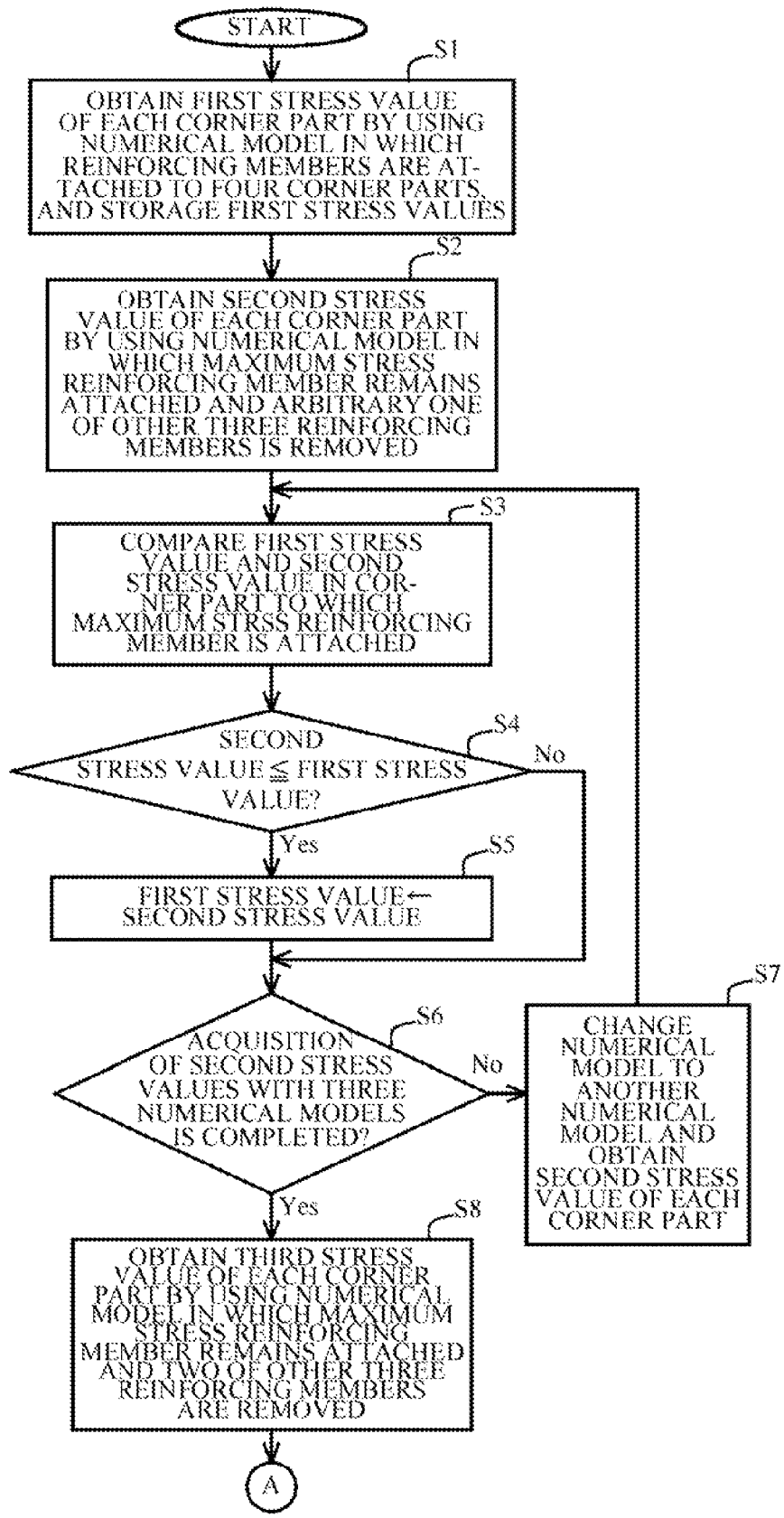
FIGS. 5A and 5B illustrate flowcharts explaining a method of determining a reinforcement position of the substrate assembly of the embodiment.
Figure 5B:
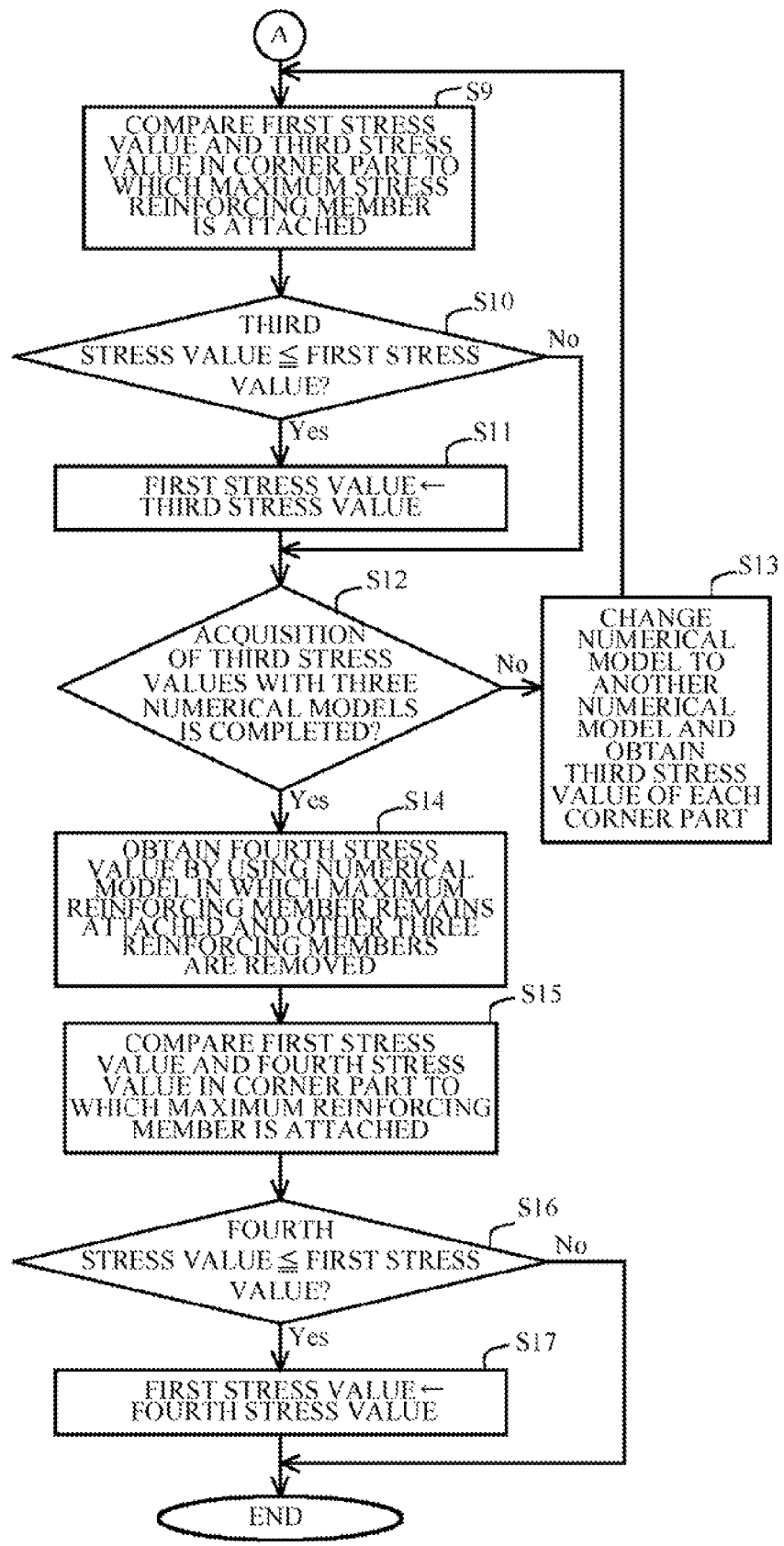

Table 1 indicates simulation results obtained by following flowcharts illustrated in FIGS. 5A and 5B.

A process of a step S1 is described first. In the step S1, a first stress value of each corner part is obtained by using a numerical model in which a reinforcing member is attached to all corner parts, that is to say, four corner parts A through D. At this time, information about the studs 6 is incorporated, and reflected to the calculation. The calculation to obtain first stress values is executed by the operation section 11. The first stress value in the corner part A is 9.75 MPa, the first stress value in the corner part B is 94.62 MPa, the first stress value of the corner part C is 7.84 MPa, and the first stress value in the corner part D is 194.10 MPa. The numerical model, information about the studs 6, and first stress values are stored in the storage section 13. The process until this point is carried out with following procedures for example. First, a numerical model of the circuit board 2, in which the electronic component 4 is mounted in the front surface by multiple the bumps 5 and reinforcing members are attached to positions corresponding to the bumps 5 located in corner parts A through D of the electronic component 4 in the back surface, is set. More specifically, the above described numerical model of the circuit board 2 is stored in the storage section 13 of the information processing device 10. Then, information about the studs 6 that are arranged in the periphery of the electronic component 4 and fix the circuit board 2 to the chassis 101 of the electronic device 100 is incorporated into the numerical model. That is to say, the numerical model to which the information about the studs 6 is added is stored in the storage section 13. As described above, after incorporating the information about the studs 6 into the storage section 13, the simulation of a case where the external force is applied to the circuit board 2 is performed. More specifically, a simulation for calculating stress values generated in the bumps 5 in corner parts A through D when the force is applied to the electronic component 4 from the back side of the circuit board 2 is performed.

In a step S2, a second stress value of each corner part is obtained by using a numerical model in a state in which the reinforcing member in a part of corner parts is removed and a part of reinforcing members remains attached. More specifically, the maximum stress reinforcing member remains attached, and arbitrary one of the other three reinforcing members is removed. Here, the maximum stress reinforcing member is a reinforcing member corresponding to a bump of which the first stress value is largest. In the present embodiment, as the first stress value of the corner part D is largest, the reinforcing member corresponding to the corner part D becomes the maximum stress reinforcing member. Therefore, in the step S2, the reinforcing member of the corner part D

TABLE 1

| REINFORCEMENT POSITION | CORNER PART A STRESS VALUE | CORNER PART B STRESS VALUE | CORNER PART C STRESS VALUE | CORNER PART D STRESS VALUE | TOTAL STRESS VALUE |
|---|---|---|---|---|---|
| NO REINFORCEMENT (REFERENCE) | 24.99 | 116.80 | 21.28 | 250.80 | 413.87 |
| CORNER PARTS A, B, C AND D | 9.75 | 94.62 | 7.84 | 194.10 | 306.31 |
| CORNER PARTS B, C AND D | 21.78 | 85.49 | 5.77 | 202.90 | 315.94 |
| CORNER PARTS A, C AND D | 7.47 | 113.30 | 5.59 | 203.00 | 348.36 |
| CORNER PARTS A, B AND D | 9.67 | 87.47 | 20.36 | 194.50 | 312.00 |
| CORNER PARTS C AND D | 4.22 | 125.20 | 5.28 | 202.60 | 337.30 |
| CORNER PARTS B AND D | 31.42 | 103.70 | 12.50 | 201.30 | 348.92 |
| CORNER PARTS A AND D | 13.06 | 75.79 | 16.58 | 194.20 | 299.63 |
| CORNER PART D | 12.22 | 122.80 | 19.60 | 175.40 | 330.02 |

Unit: MPa remains attached. Then, the second stress value of each corner part is obtained first by using a numerical model in which the reinforcing member of the corner part A is removed and reinforcing members are attached to the corner part B, the corner part C, and the corner part D. As a result, the second stress value in the corner part A becomes 21.78 MPa, the second stress value in the corner part B becomes 85.49 MPa, the second stress value in the corner part C becomes 5.77 MPa, and the second stress value in the corner part D becomes 202.90 MPa. These second stress values are stored in the storage section 13 temporarily.

In a step S3, the first stress value and the second stress value in the corner part to which the maximum stress reinforcing member is attached are compared. Here, as the corner part D is the corner part to which the maximum stress reinforcing member is attached, the first stress value 194.10 MPa and the second stress value 202.90 MPa in the corner part D are compared.

In a step S4, a comparison result in the step S3 is judged. More specifically, when the second stress value is equal to or smaller than the first stress value and the judgment of the step S4 is Yes, the process moves to a step S5, and when the judgment of the step S4 is No, the process moves to a step S6 without going through the step S5. At this point, as the judgment of the step S4 becomes No, the process of the step S6 is carried out just after the step S4.

In the step S6, it is judged whether the acquisition of second stress values with three numerical models is completed. In the process of the step S2, the numerical model, in which the maximum stress reinforcing member remains attached and one reinforcing member out of other three is removed, is being selected. Here, three numerical models are considered as the numerical model in which one reinforcing member out of other three is removed. More specifically, three numerical models include a numerical model in which the reinforcing member of the corner part A is removed, a numerical model in which the reinforcing member of the corner part B is removed, and a numerical model in which the reinforcing member of the corner part C is removed. In the step S6, it is judged whether the simulation has been performed to all of these three numerical models. When carrying out the process of the step S6 for the first time, the judgment becomes No, and the process moves to a step S7.

In the step S7, the numerical model is changed to another numerical model, and the second stress value of each corner part is obtained. Here, the second stress value of each corner part is obtained by using the numerical model in which the reinforcing member of the corner part B is removed and reinforcing members are attached to the corner part A, the corner part C, and the corner part D. As a result, the second stress value in the corner part A becomes 7.47 MPa, the second stress value in the corner part B becomes 133.30 MPa, the second stress value in the corner part C becomes 5.59 MPa, and the second stress value in the corner part D becomes 203.00 MPa. These second stress values are stored in the storage section 13 temporarily.

In the step S3 executed again, the first stress value and the second stress value in the corner part to which the maximum stress reinforcing member is attached are compared. Here, as the corner part D is the corner part to which the maximum stress reinforcing member is attached, the first stress value 194.10 MPa and the second stress value 203.00 MP in the corner part D are compared.

In the step S4 executed again, the comparison result in the step S3 is judged. More specifically, when the second stress value is equal to or smaller than the first stress value and the judgment of the step S4 is Yes, the process moves to the step S5, and when the judgment of the step S4 is No, the process moves to the step S6 without going through the step S5. In the present embodiment, as the judgment in the step S4 becomes No again, the process of the step S6 is executed just after the step S4.

In the step S6 executed again, it is judged whether the acquisition of second stress values with three numerical models is completed. At this point, the simulation using the numerical model in which the reinforcing member of the corner part C is removed and reinforcing members are attached to the corner part A, the corner part B, and the corner part D is not performed yet. Therefore, the judgment of the step S6 becomes No again.

In the step S7 executed again, the numerical model is changed to another numerical model again, and the second stress value of each corner part is obtained. Here, the second stress value of each corner part is obtained by using the numerical model in which the reinforcing member of the corner part C is removed and reinforcing members are attached to the corner part A, the corner part B, and the corner part D. As a result, the second stress value in the corner part A becomes 9.67 MPa, the second stress value in the corner part B becomes 87.47 MPa, the second stress value in the corner part C becomes 20.36 MPa, and the second stress value in the corner part D becomes 194.50 MPa. These second stress values are stored in the storage section 13 temporarily.

In the step 3 executed again, the first stress value and the second stress value in the corner part to which the maximum stress reinforcing member is attached are compared. Here, as the corner part D is the corner part to which the maximum stress reinforcing member is attached, the first stress value 194.10 MPa and the second stress value 194.50 MPa in the corner part D are compared.

In the step S4 executed again, the comparison result in the step S3 is judged. More specifically, when the second stress value is equal to or smaller than the first stress value and the judgment of the step S4 is Yes, the process moves to the step S5, and when the judgment of the step S4 is No, the process moves to the step S6 without going through the step S5. In the present embodiment, the judgment in the step S4 becomes No again, the process of the step S6 is executed just after the step S4.

In the step S6 executed again, it is judged whether the acquisition of second stress values with three numerical models is completed. At this point, second stress values according to three numerical models are obtained. Thus, the judgment in the step S6 becomes Yes. Then, the process moves to a step S8.

In the step S8, a third stress value of each corner part is obtained by using a numerical model of a state in which the reinforcing member of a further part of corner parts is removed and a part of reinforcing members remains attached. More specifically, the third stress value of each corner part is obtained by using the numerical model in which the maximum stress reinforcing member remains attached and two of the other three reinforcing members are removed. In the present embodiment, as described above, as the first stress value of the corner part D is largest, the reinforcing member corresponding to the corner part D becomes the maximum stress reinforcing member. Thus, in the step S8, the reinforcing member of the corner part D remains attached. Then, the third stress value of each corner part is obtained by using the numerical model in which reinforcing members of the corner part A and the corner part B are removed and reinforcing members are attached to the corner part C and the corner part D. As a result, the third stress value in the corner part A becomes 4.22 MPa, the third stress value in the corner part B becomes 125.20 MPa, the third stress value in the corner part C becomes 5.28 MPa, and the third stress value in the corner part D becomes 202.60 MPa. These third stress values are stored in the storage section 13 temporarily.

In a step S9, the first stress value and the third stress value in the corner part to which the maximum stress reinforcing member is attached are compared. Here, as the corner part D is the corner part to which the maximum stress reinforcing member is attached, the first stress value 194.10 MPa and the third stress value 202.60 MPa in the corner part D are compared.

In a step S10, the comparison result in the step S9 is judged. More specifically, when the third stress value is equal to or smaller than the first stress value and the judgment of the step S10 is Yes, the process moves to a step S11, and when the judgment of the step S10 is No, the process moves to a step S12 without going through a step S11. At this point, as the judgment of the step S10 becomes No, the process of the step S12 is executed just after the step S10.

In the step S12, it is judged whether the acquisition of third stress values with three numerical models is completed. In the process of the step S8, the numerical model, in which the maximum stress reinforcing member remains attached and two of the other three reinforcing members are removed, is being selected. Here, three numerical models are considered as the numerical model in which two reinforcing members out of the other three are removed. More specifically, three numerical models include a numerical model in which reinforcing members in the corner part A and the corner part B are removed, a numerical model in which reinforcing members in the corner part A and the corner part C are removed, and a numerical model in which reinforcing members in the corner part B and the corner part C are removed. In the step S12, it is judged whether the simulation has been performed to all of these three numerical models. When executing the process of the step S12 for the first time, the judgment becomes No, and the process moves to a step S13.

In the step S13, the numerical model is changed to another numerical model, and the third stress value of each corner part is obtained. Here, the third stress value of each corner part is obtained by using the numerical model in which reinforcing members in the corner part A and the corner part C are removed and reinforcing members are attached to the corner part B and the corner part D. As a result, the third stress value in the corner part A becomes 31.42 MPa, the third stress value in the corner part B becomes 103.70 MPa, the third stress value in the corner part C becomes 12.50 MPa, and the third stress value in the corner part D becomes 201.30 MPa. These third stress value are stored in the storage section 13 temporarily.

In the step S9 executed again, the first stress value and the third stress value in the corner part to which the maximum stress reinforcing member is attached are compared. Here, as the corner part D is the corner part to which the maximum stress reinforcing member is attached, the first stress value 194.10 MPa and the third stress value 201.30 MPa in the corner part D are compared.

In the step S10 executed again, the comparison result in the step S9 is judged. More specifically, when the third stress value is equal to or smaller than the first stress value and the judgment of the step S10 is Yes, the process moves to the step S11, and when the judgment of the step S10 is No, the process moves to the step S12 without going through the step S11. In the present embodiment, the judgment in the step S10 becomes No again, the process of the step S12 is executed just after the step S10.

In the step S12 executed again, it is judged whether the acquisition of third stress values with three numerical models is completed. At this point, the simulation using the numerical model, in which reinforcing members in the corner part B and the corner part C are removed and reinforcing members are attached to the corner part A and the corner part D, is not performed yet. Therefore, the judgment of the step S12 becomes No again.

In the step S13 executed again, the numerical model is changed to another numerical model again, and the third stress value of each corner part is obtained. Here, the third stress value of each corner part is obtained by using the numerical model in which reinforcing members in the corner part B and the corner part C are removed and reinforcing members are attached to the corner part A and the corner part D. As a result, the third stress value in the corner part A becomes 13.06 MPa, the third stress value in the corner part B becomes 75.79 MPa, the third stress value in the corner part C becomes 16.58 MPa, and the third stress value in the corner part D becomes 194.20 MPa. These third stress value are stored in the storage section 13 temporarily.

In the step S9 executed again, the first stress value and the third stress value in the corner part to which the maximum stress reinforcing member is attached are compared. Here, as the corner part D is the corner part to which the maximum stress reinforcing member is attached, the first stress value 194.10 MPa and the third stress values 194.20 MPa in the corner part D are compared.

In the step S10 executed again, the comparison result in the step S9 is judged. More specifically, when the third stress value is equal to or smaller than the first stress value and the judgment of the step S10 is Yes, the process moves to the step S11, and when the judgment of the step S10 is No, the process moves to the step S12 without going through the step S11. In the present embodiment, the judgment in the step S10 becomes No again, the process of the step S12 is executed just after the step S10.

In the step S12 executed again, it is judged whether the acquisition of third stress values with three numerical models is completed. At this point, third stress values according to three numerical models are obtained. Thus, the judgment of the step S12 becomes Yes. Then, the process moves to a step S14.

In the step S14, a fourth stress value of each corner part is obtained by using a numerical model of a state in which the reinforcing member of a further part of corner parts is removed, and a part of reinforcing members remains attached. More specifically, the fourth stress value of each corner part is obtained by using the numerical model in which only the maximum stress reinforcing member remains attached and the other three reinforcing members are removed. In the present embodiment, as described above, as the first stress value of the corner part D is largest, the reinforcing member corresponding to the corner part D becomes the maximum stress reinforcing member. Thus, in the step S14, the fourth stress value of each corner part is calculated by using the numerical model in which only the reinforcing member of the corner part D remains attached, and reinforcing members of the corner part A through the corner part C are removed. As a result, the fourth stress value in the corner part A becomes 12.22 MPa, the fourth stress value in the corner part B becomes 122.80 MPa, the fourth stress value in the corner part C becomes 19.60 MPa, and the fourth stress value in the corner part D becomes 175.40 MPa. These fourth stress values are stored in the storage section 13 temporarily.

In a step S15, the first stress value and the fourth stress value in the corner part to which the maximum stress reinforcing member is attached are compared. Here, as the corner part D is the corner part to which the maximum stress reinforcing member is attached, the first stress value 194.10 MPa and the fourth stress value 175.40 MPa in the corner part D are compared.

In a step S16, the comparison result in the step S15 is judged. More specifically, when the fourth stress value is equal to and smaller than the first stress value and the judgment of the step S16 is Yes, the process moves to a step S17, and when the judgment of the step S16 is No, the process is terminated (end) without going through the step S17. At this point, as the judgment of the step S16 becomes Yes, the process of the step S17 is executed after the step S16.

In the step S17, 194.10 MP which has been stored as the first stress value until this point is replaced with the fourth stress value obtained in the step S14. Before arriving at the step S17, the step S5 and the step S11 are executed. In the step S5 and the step S11, when the replacement of the first stress value is executed, the value which is being stored as the first stress value at that time is replaced.

The value being stored as the first stress value at the time when the process of the step S17 is finished becomes the first stress value that is eventually adopted. In addition, the position in which the reinforcing member exhibiting the first stress value that is eventually adopted as described above is located becomes a position that is eventually adopted as the position in which the reinforcing member is located.

In a case of the present embodiment, the substrate assembly 1 in which the reinforcing member is attached to only the corner part D is a design in which the countermeasure against the warpage is implemented most efficiently. Table 1 also indicates the result of simulation performed in a state in which the reinforcing member is not attached to any of four corner parts as reference. When only the corner part D is reinforced, compared to a case where four corner parts are reinforced, the total stress value is almost equal, but stress values of corner parts are equalized. When the reinforcing member is not attached at all, the corner part D of four corner parts has a maximum stress value, and 250.80 MPa is measured. The stress value in the corner part D can be reduced to 175.40 MPa by locating the reinforcing member to the reinforcement position determined by the method of determining a reinforcement position in accordance with the present embodiment.

On the other hand, focusing on the corner part B, whereas the stress value in a case where the reinforcing member is not attached is 116.80 MPa, it increases to 122.80 MPa in a case where the reinforcing member is attached to only the corner part D. However, the stress value of the corner part D that is most stressed is reduced. That is to say, according to the method of determining a reinforcement position in accordance with the present embodiment, it is possible to take the minimum countermeasure to reduce the warpage so as to equalize stress values generated in corner parts. When the stress value of a part of corner parts is very large compared to stress values of other corner parts, the load is applied to only the corner part of which the stress value is very large. It is possible to equalize stresses generated in corner parts by adopting the method of determining a reinforcement position in accordance with the present embodiment as the countermeasure to reduce the warpage.

The pressure test is actually executed to the reinforced substrate assembly, and a crack is generated in a bump when four corner parts are reinforced, but a crack is not generated when only the corner part D is reinforced.

By performing the above described simulation in advance, it is possible to determine which corner part is to be reinforced in accordance with positions of the studs 6 easily.

Flowcharts illustrated in FIGS. 5A and 5B are an example of the method of determining a reinforcement position. In flowcharts illustrated in FIGS. 5A and 5B, a simulation in which the reinforcing member is removed one by one is performed first, but the simulation in which two reinforcing members are removed may be performed first, or the simulation in which three reinforcing members are removed may be performed first. In other words, it is sufficient if simulations are performed to all combinations of reinforcement positions eventually, and it is no matter from which numerical model the simulation is performed.

Hereinafter, referring to Table 2 and FIG. 6 through FIG. 27, a description will be given of results when the method of determining a reinforcement position is applied to various sorts of arrangement patterns of studs.

Figure 6A:
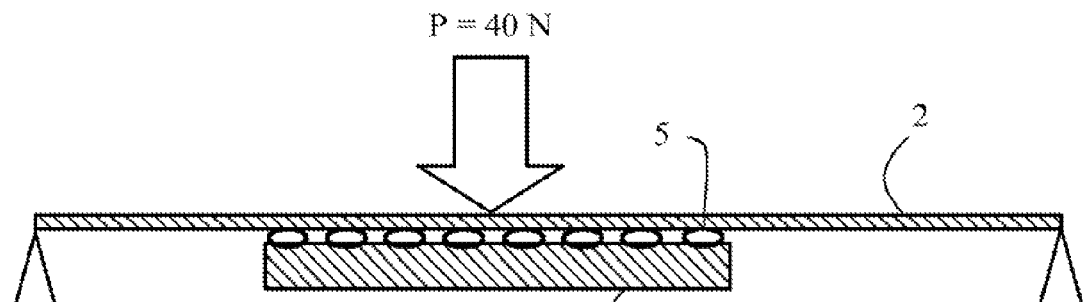
FIGS. 6A and 6B are explanatory diagrams schematically illustrating a model used in a simulation.
Figure 6B:
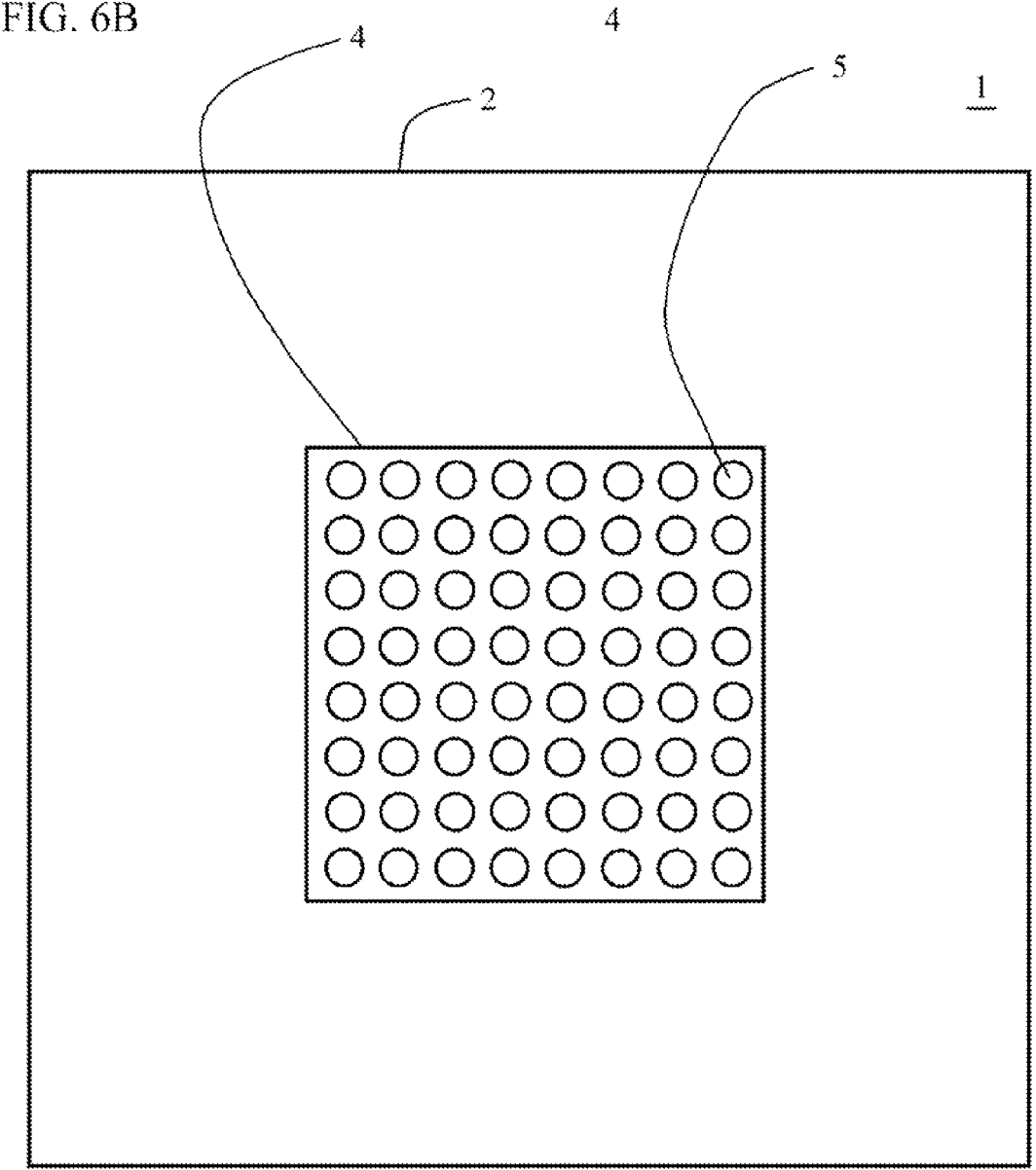
Figure 7:
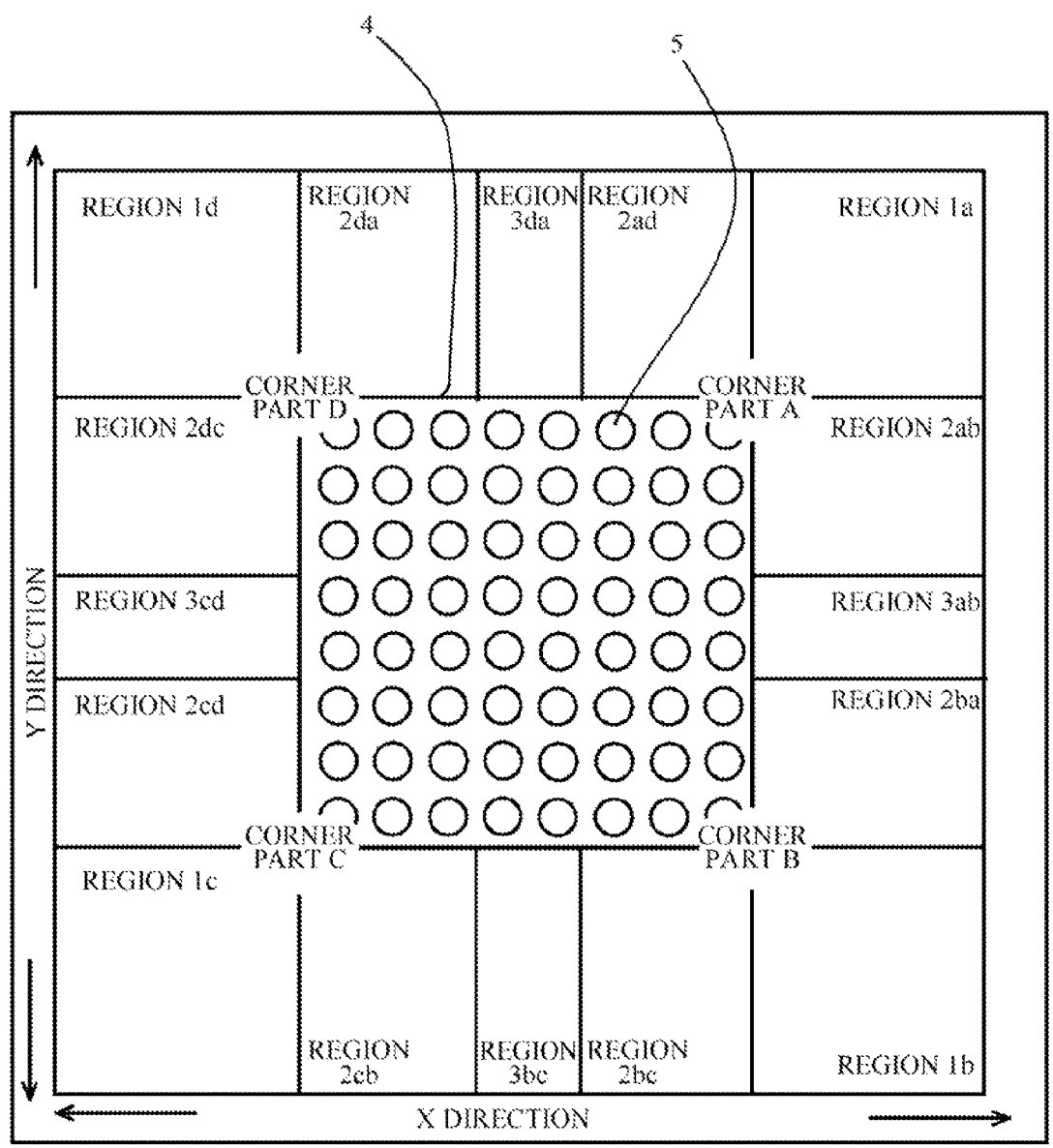
FIG. 7 is an explanatory diagram illustrating an example of dividing the periphery of the electronic component into multiple regions.

By using the numerical model of the substrate assembly schematically illustrated in FIG. 6, values of stresses generated in the corner part A, the corner part B, the corner part C, and the corner part D are calculated. A simulation is performed by the TEG (Test element group) evaluation. In the present embodiment, a 110-by-110 millimeters circuit board 2 with a thickness t of 1.0 mm including a 23-by-23 millimeters electronic component (BGA component) 4 and about 600 bumps is used. Then, a load of 40 N is applied to the center area of the back side of the electronic component. In addition, a support point corresponding to the fixed part is set to the location 5 mm apart from the bump 5 located in the most outer ward of the electronic component 4.

Table 2 indicates the stress of each corner part in a case where the reinforcement is not performed, and the stress of each corner part in a case where the reinforcement is performed. The unit of the stress value is MPa. As a comparison example of a case in which the reinforcement is performed, stress values in a case where corner parts A through D are reinforced are indicated. A part of results in a case where the reinforcement is performed is omitted. Although the reinforcement can be performed by any methods conventionally known, in the present embodiment, a method of bonding a reinforcing member 10 to the back side of the position to be reinforced by solder is adopted. The thick-frame column represents the corner part that needs to be reinforced, and the hatched column represents the corner part to which the reinforcement has been performed.

TABLE 2

| SIMULATION No. | STUD 6α | STUD 6β | REINFORCEMENT POSITION | CORNER PART A | CORNER PART B | CORNER PART C | CORNER PART D | NOTE |
|---|---|---|---|---|---|---|---|---|
| 1.0 | REGION 1a | | | 212.8 | 408.2 | 1533.0 | 421.9 | NO REINFORCEMENT |
| 1.1 | | | ABCD | 113.8 | 214.1 | 803.8 | 225.0 | REINFORCE FOUR CORNER PARTS |
| 1.2 | | | C | 82.7 | 324.1 | 602.8 | 190.1 | REINFORCE ONE CORNER PART |
| 2.0 | REGION 2ab | | | 1299.9 | 285.6 | 588.7 | 480.3 | NO REINFORCEMENT |
| 2.1 | | | ABCD | 680.1 | 145.8 | 748.3 | 411.0 | REINFORCE FOUR CORNER PARTS |
| 2.2 | | | A | 532.8 | 217.7 | 605.4 | 423.7 | REINFORCE ONE CORNER PART |
| 3.0 | REGION 3ab | | | 502.3 | 497.2 | 849.4 | 797.6 | NO REINFORCEMENT |
| 3.1 | | | ABCD | 291.5 | 315.3 | 333.3 | 335.0 | REINFORCE FOUR CORNER PARTS |
| 3.2 | | | CD | 330.7 | 379.2 | 177.9 | 181.9 | REINFORCE TWO CORNER PARTS |
| 4.0 | REGION 1a | REGION 1c | | 382.8 | 123.4 | 386.6 | 93.3 | NO REINFORCEMENT |
| 4.1 | | | ABCD | 385.4 | 5.1 | 435.2 | 6.0 | REINFORCE FOUR CORNER PARTS |
| 4.2 | | | AC | 295.2 | 97.5 | 341.2 | 96.3 | REINFORCE TWO CORNER PARTS |
| 5.0 | REGION 1a | REGION 2cd | | 595.5 | 185.2 | 147.4 | 11.2 | NO REINFORCEMENT |
| 5.1 | | | ABCD | 85.9 | 13.2 | 387.3 | 119.5 | REINFORCE FOUR CORNER PARTS |
| 5.2 | | | A | 82.3 | 8.8 | 320.0 | 151.3 | REINFORCE ONE CORNER PART |
| 6.0 | REGION 1a | REGION 3cd | | 327.6 | 176.1 | 57.7 | 117.6 | NO REINFORCEMENT |
| 7.0 | REGION 2ab | REGION 2cb | | 106.5 | 65.9 | 107.2 | 56.1 | NO REINFORCEMENT |
| 8.0 | REGION 2ab | REGION 3cd | | 226.2 | 132.6 | 56.7 | 51.8 | NO REINFORCEMENT |
| 9.0 | REGION 3ab | REGION 3cd | | 61.6 | 45.7 | 49.8 | 59.8 | NO REINFORCEMENT |
| 10.0 | REGION 1a | REGION 1d | | 340.8 | 902.1 | 835.5 | 334.6 | NO REINFORCEMENT |
| 10.1 | | | ABCD | 234.5 | 283.1 | 322.1 | 238.0 | REINFORCE FOUR CORNER PARTS |
| 10.2 | | | BC | 235.8 | 246.3 | 287.1 | 223.3 | REINFORCE TWO CORNER PARTS |
| 11.0 | REGION 1a | REGION 2dc | | 420.6 | 646.6 | 244.8 | 722.9 | NO REINFORCEMENT |
| 11.1 | | | ABCD | 225.6 | 199.9 | 63.7 | 268.8 | REINFORCE FOUR CORNER PARTS |
| 11.2 | | | ABD | 211.0 | 172.3 | 157.8 | 252.6 | REINFORCE THREE CORNER PARTS |
| 12.0 | REGION 2ab | REGION 2dc | | 374.4 | 231.0 | 228.8 | 360.3 | NO REINFORCEMENT |
| 12.1 | | | ABCD | 127.2 | 86.1 | 73.4 | 155.3 | REINFORCE FOUR CORNER PARTS |
| 12.2 | | | AD | 128.4 | 173.1 | 131.2 | 149.8 | REINFORCE TWO CORNER PARTS |
| 13.0 | REGION 1a | REGION 2ad | | 1287.0 | 468.0 | 801.4 | 110.9 | NO REINFORCEMENT |
| 13.1 | | | ABCD | 691.9 | 42.0 | 249.1 | 51.6 | REINFORCE FOUR CORNER PARTS |
| 13.2 | | | AC | 577.5 | 66.4 | 182.0 | 54.5 | REINFORCE TWO CORNER PARTS |
| 14.0 | REGION 1a | REGION 3da | | 830.5 | 585.8 | 951.7 | 610.3 | NO REINFORCEMENT |
| 15.0 | REGION 1a | REGION 2da | | 756.7 | 562.5 | 812.1 | 398.7 | NO REINFORCEMENT |
| 16.0 | REGION 2ab | REGION 2ad | | 2076.0 | 123.0 | 1088.0 | 92.3 | NO REINFORCEMENT |
| 17.0 | REGION 2ab | REGION 3da | | 1069.0 | 136.4 | 672.5 | 131.3 | NO REINFORCEMENT |
| 18.0 | REGION 2ab | REGION 2da | | 1127.0 | 197.5 | 440.2 | 221.6 | NO REINFORCEMENT |
| 19.0 | REGION 3ab | REGION 3da | | 377.7 | 34.1 | 471.8 | 35.1 | NO REINFORCEMENT |
| 20.0 | REGION 2ba | REGION 2da | | 161.4 | 102.7 | 217.9 | 81.3 | NO REINFORCEMENT |

A description will now be given of an arrangement of the studs 6 that become a fixed point. It is grasped in which region of regions illustrated in FIG. 7 the studs 6 that become fixed points exist. Here, a description will be given of the segmentation of regions. Regions are roughly divided into three regions; regions expressed as a region 1$x$, regions expressed as a region 2$xx$ and regions expressed as a region 3$xx$.

The region 1$x$ is a rectangular region of which two sides are made of lines formed by extending sides forming the corner part. For example, a region that is surrounded by the extended line of the side AB and the extended line of the side DA and in which the corner part A is included is expressed as a region 1$a$. Other corner parts are expressed in the same manner. For convenience sake, an X direction and a Y direction are defined as directions illustrated with arrows in FIG. 7. In addition, a plus (+) direction and a minus (−) direction are defined in each of the X direction and the Y direction. For example, when the region 1$a$ is described by focusing on the side AB and the corner part A, the region 1$a$ is a plus (+) region in the X direction and the Y direction.

The region 2$xx$ is a rectangular region adjacent to the region 1$x$. More specifically, the region 2$xx$ is a region moved to the center point side of the side along the side of the electronic component 4 from the region 1$x$. For example, the region moved along the side AB from the region 1$a$ is expressed as a region 2$ab$. The region 2$ab$ is expressed as a region that is plus (+) in the X direction and is minus (−) in the Y direction from the corner part A.

The region 3$xx$ is a rectangular region adjacent to the region 2$xx$. More specifically, the region 3$xx$ is a region including a center point of the side and sandwiched by the regions 2$xx$. For example, a region sandwiched by the region 2$ab$ and a region 2$ba$ is expressed as a region 3$ab$. The region 3$ab$ is a region of which the distance from the corner part A along the side AB is nearly equal to the distance from the corner part B. When a line segment bisecting the side AB crosses the stud 6, the stud 6 is located in the region 3$ab$. A width of the region 3$xx$ is set to be equal to the diameter of the stud 6. For example, when the diameter φ of the stud 6 is 5 mm, the width of the region 3$xx$ is set to 5 mm.

Figure 8:
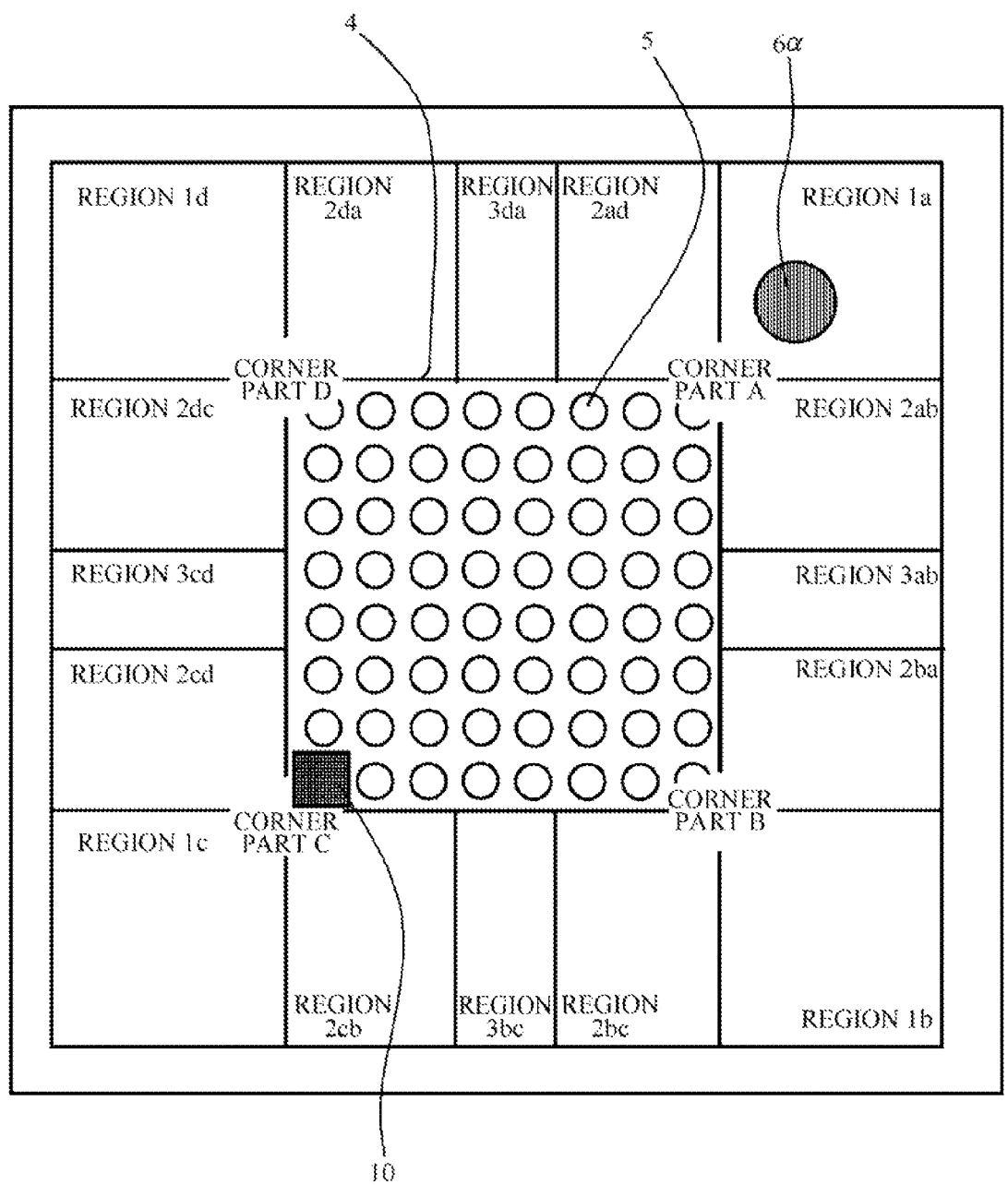
FIG. 8 is an explanatory diagram illustrating a circuit board that is reinforced based on a simulation No. 1.2.

(Simulation No. 1.0, FIG. 8)

The simulation No. 1.0 is a case in which the single stud 6α is arranged as illustrated in FIG. 8. The stud 6α is located in the region 1$a$. When the reinforcement is not performed, that is to say, when the reinforcing member 10 is not attached, the stress value of the corner part C is 1533.0 MPa and largest. The reason why the stress value of the corner part C becomes largest is because an effort point, a fulcrum and a load point exist on a straight line connecting the corner part A to the corner part C (hereinafter, abbreviated as a "line AC"). The fixed part of the stud 6α becomes the fulcrum, the position near the center of the electronic component 4 becomes the effort point, and the position of the corner part C becomes the load point. The stress is concentrated on the corner part C of which the moment becomes large when the above-described relation is achieved. Although stresses are generated also in the corner part B and the corner part D because the electronic component 4 can be considered as a rigid body, as the corner part B and the corner part D are located in positions of which distances from the stud 6α are almost equal, and generated stresses are divided equally, stresses generated in the corner part B and the corner part D become small. According to the reason described above, the position to be reinforced becomes the corner part C. Then, the corner part A exhibiting the minimum stress value is a corner part of which the distance from the stud 6α supporting the circuit board 2 is shortest. As described above, when the effort point, the fulcrum, and the load point exist on a single straight line, the value of stress generated in the corner part C exhibiting the maximum stress value is reduced by removing the reinforcing member of the corner part A exhibiting the minimum stress value. Thus, under such conditions, the reinforcing member 10 is not attached to at least corner part A.

(Simulation No. 1.1, FIG. 8)

The simulation No. 1.1 is a result of the simulation in a case where corner parts A through D are reinforced in accordance with the arrangement of the stud in the simulation No. 1.0. Under such conditions, the stress value of each corner part is reduced evenly. However, the stress value of the corner part C exhibits a highly large value compared to stress values of other corner parts. Thus, it is considered that the fatigue of the corner part C proceeds fast compared to other corner parts.

(Simulation No. 1.2, FIG. 8)

The simulation No. 1.2 is a result of the simulation in a case where only the corner part C is reinforced based on the method of determining a reinforcement position in accordance with the present embodiment. Under such conditions the stress value in the corner part B increases compared to a case where four corner parts are reinforced, but stress values decrease in other corner parts. According to the above described result, stress values are equalized among corner parts. Accordingly, it is expected that the resistance properties to the pressure of and the long term reliability of the substrate assembly 1 are improved.

Figure 9:
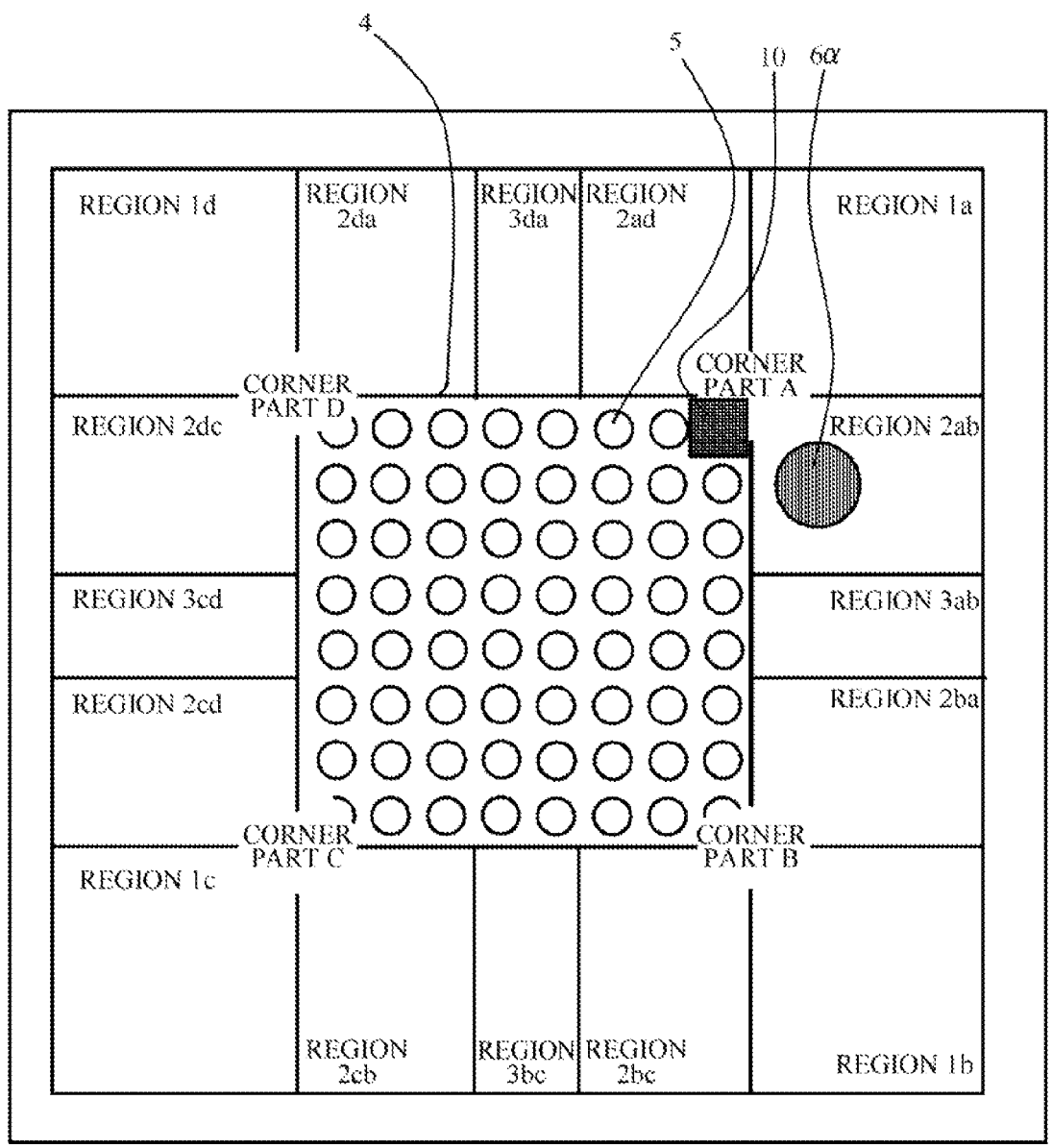
FIG. 9 is an explanatory diagram illustrating a circuit board that is reinforced based on a simulation No. 2.2.

(Simulation No. 2.0, FIG. 9)

The simulation No. 2.0 is a case where a single stud 6α is arranged as illustrated in FIG. 9. The stud 6α is located in the region 2$ab$. When the reinforcement is not performed, that is to say, when the reinforcing member 10 is not attached, the stress value of the corner part A is 1299.9 MPa and the largest. In this case, compared to the simulation No. 1.0, the stress concentrated on the corner part C is distributed to the corner part D. Then, as the distance between the stud 6α to become the fulcrum and the corner part C becomes short, compared to the simulation No. 1.0, the stress of the corner part C decreases. The compression stress is generated in the corner part A. The reason is considered as follows. The fulcrum (stud 6α), the effort point, and the load point (corner part A) are not in a straight line relation, and a fixed point located sufficiently far from the electronic component 4 and the stud 6α become fulcrums, and a torsion is generated. At this time, as the electronic component 4 is a rigid body, and tries to maintain its shape, it tries to squash the bump 5 by the deformation of the substrate. As the stud 6α tries to suppress the substrate deformation, the strain of the circuit board 2 around the stud 6α becomes large. Thus, it is considered that the strain in the Y direction is concentrated on the corner part A close to the stud 6α, and the stress value becomes large.

(Simulation No. 2.1, FIG. 9)

The simulation No. 2.1 is a result of the simulation in a case where corner parts A through D are reinforced in accordance with the arrangement of the stud in the simulation No. 2.0. Under such conditions, the stress value of each corner part decreases except the corner part C. However, the stress value of the corner part C rises. There is a big difference in stress value from the corner part B of which the stress value is smallest. Thus, it is considered that the fatigue of the corner part C proceeds fast compared to other corner parts.

(Simulation No. 2.2, FIG. 9)

The simulation No. 2.2 is a result of the simulation in a case where only the corner part A is reinforced based on the method of determining a reinforcement position in accordance with the present embodiment corner part A. Under such conditions, stress values increase in the corner part B and the corner part D compared to a case where four corner parts are reinforced, but stress values decrease in other corner parts. According to the above described result, stress values are equalized among corner parts. Accordingly, it is expected that the resistance properties to the pressure of and the long term reliability of the substrate assembly 1 are improved. Also in this case, the corner part B of which the stress value is smallest is not reinforced either.

Figure 10:
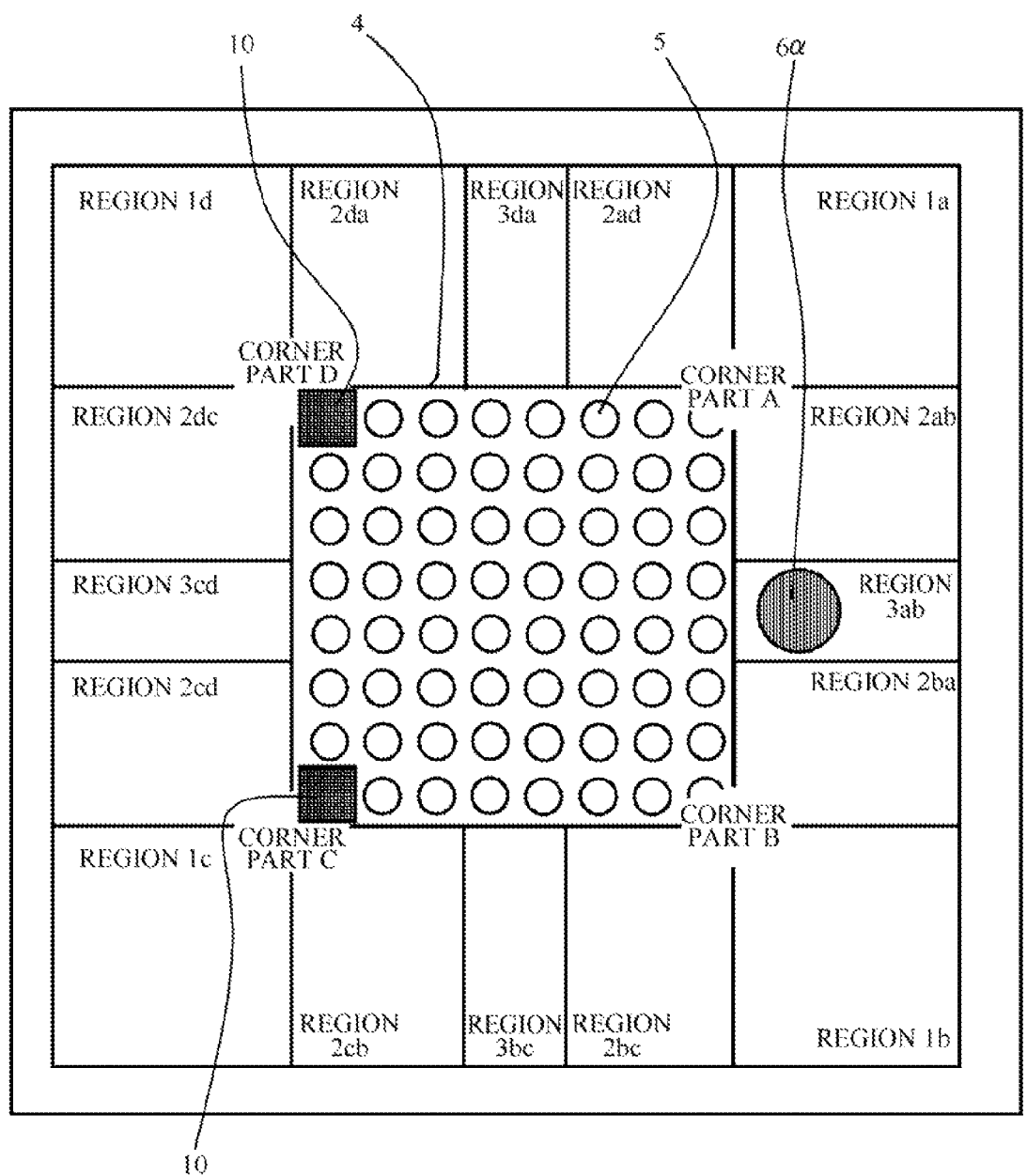
FIG. 10 is an explanatory diagram illustrating a circuit board that is reinforced based on a simulation No. 3.2.

(Simulation No. 3.0, FIG. 10)

The simulation No. 3.0 is a case where the single stud 6α is arranged as illustrated in FIG. 10. The stud 6α is located in the region 3ab. When the reinforcement is not performed, that is to say, when the reinforcing member 10 is not attached, the stress value of the corner part C and the stress value of the corner part D are 849.4 MPa and 797.6 MPa respectively, and large. In this case, stress values in the corner part C and the corner part D are nearly equal, and stress values in the corner part A and the corner part B become nearly equal. However, it is considered that as the corner part A and the corner part B that are close to the stud 6α are away from each other, the stress in a torsion direction becomes negligibly small and stresses of the corner part C and the corner part D that have large moments become large. Thus, it is considered that the reinforcement of the corner part C and the corner part D is effective.

(Simulation No. 3.1, FIG. 10)

The simulation No. 3.1 is a result of the simulation in a case where corner parts A through D are reinforced in accordance with the arrangement of the stud in the simulation No. 3.0. Under such conditions, the stress value of each corner part decreases. Thus, it is considered that the reinforcement of corner parts A through D is effective. However, it is considered that the reinforcement of four corner parts has disadvantages in cost and simplification of manufacturing process.

(Simulation No. 3.2, FIG. 10)

The simulation No. 3.2 is a result of the simulation in a case where the corner part C and the corner part D are reinforced based on the method of determining a reinforcement position in accordance with the present embodiment. Under such conditions, the stress of each corner part decreases, and stress values are equalized among corner parts. Accordingly, it is expected that the resistance properties to the pressure of and the long term reliability of the substrate assembly 1 are improved. In addition, compared to a case of the simulation No. 3.1 in which four corner parts are reinforced, as the number of reinforcement positions is small, there are advantages in cost and simplification of manufacturing process.

Figure 11:
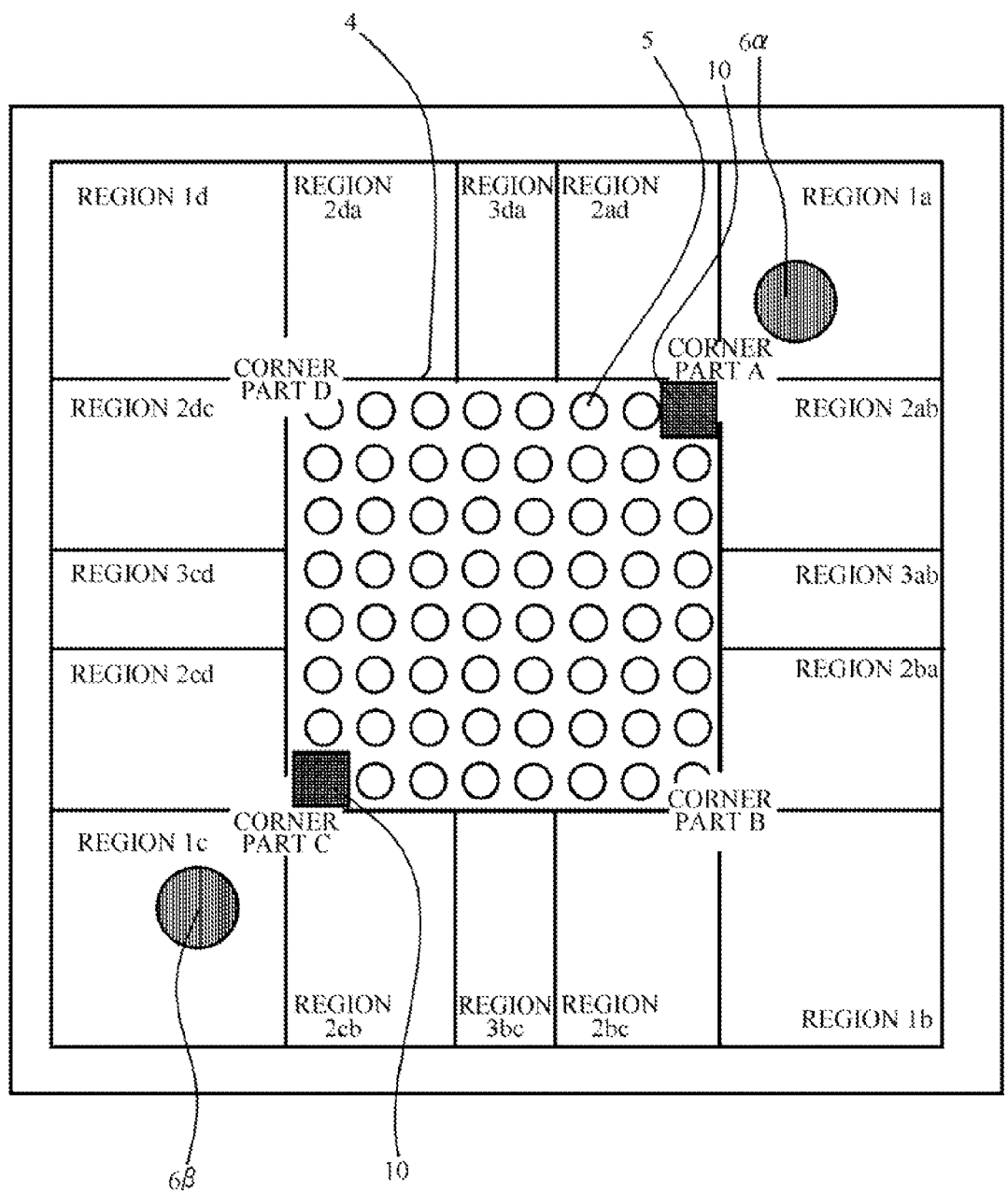
FIG. 11 is an explanatory diagram illustrating a circuit board that is reinforced based on a simulation No. 4.2.

(Simulation No. 4.0, FIG. 11)

The simulation No. 4.0 is a case where two studs, that is to say, the stud 6α and the stud 6β are arranged as illustrated in FIG. 11. The stud 6α is located in the region 1a. The stud 6β is located in a region 1c. When the reinforcement is not performed, that is to say, the reinforcing member 10 is not attached, the stress value of the corner part A and the stress value of the corner part C are 382.8 MPa and 386.6 MPa respectively, and large. In this case, so called a both-ends-supported beam structure is achieved. Thus, as the effort point, the fulcrum and the load point become in a straight line relation, the stress is concentrated on the corner part A and the corner part C.

(Simulation No. 4.1, FIG. 11)

The simulation No. 4.1 is a result of the simulation in a case where corner parts A through D are reinforced in accordance with the arrangement of studs in the simulation No. 4.0. Under such conditions, stress values of the corner part B and the corner part D distinctly decrease. Accordingly, the variability of stress values among corner parts increases. Thus, fatigues of the corner part A and the corner part C proceed fast compared to the corner part B and the corner part D.

(Simulation No. 4.2, FIG. 11)

The simulation No. 4.2 is a result of the simulation in a case where the corner part A and the corner part C are reinforced based on the method of determining a reinforcement position in accordance with the present embodiment. Under such conditions, stress values of the corner part A and the corner part C decrease, and stress values of the corner part B and the corner part D decrease very little. However, the variability of stress values among corner parts becomes small, and shifts to the direction of the equalization. Accordingly, it is expected that the resistance properties to the pressure of and the long term reliability of the substrate assembly 1 are improved.

Figure 12:
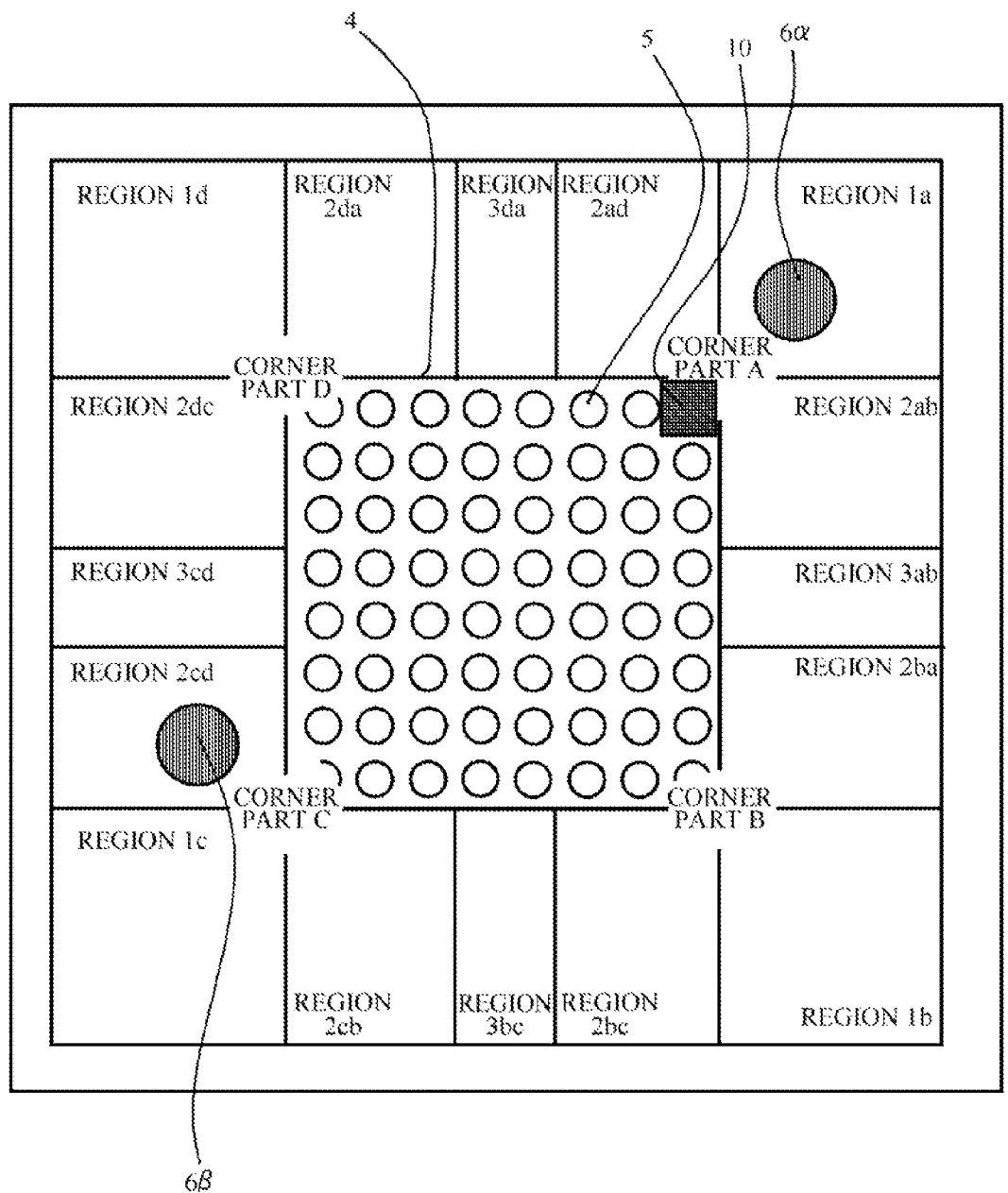
FIG. 12 is an explanatory diagram illustrating a circuit board that is reinforced based on a simulation No. 5.2.

(Simulation No. 5.0, FIG. 12)

The simulation No. 5.0 is a case where two studs, that is to say, the stud 6α and the stud 6β are arranged as illustrated in FIG. 12. The stud 6α is located in the region 1a. The stud 6β is located in a region 2cd. When the reinforcement is not performed, that is to say, the reinforcing member 10 is not attached, the stress value of the corner part A is 595.5 MPa, and large. In addition, the stress value of the corner part D is 11.2 MPa and small, and the variability of stress values is large. As there are two studs, a both-ends-supported beam structure is achieved as with the simulation No. 4.0. However, as the stud near the corner part is close to the side, strains of the bumps 5 located on the line connecting two studs become large, and the stress is concentrated. Here, as the electronic component 4 can be considered as almost rigid body, the strain of the stud 6β closer to the side is supported by multiple the bumps 5, and the stud 6a close to the corner part A supports the strain by a single bump 5 of the corner part A. Accordingly, the large stress is generated in the bump 5 close to the corner part A.

(Simulation No. 5.1, FIG. 12)

The simulation No. 5.1 is a result of the simulation in a case where corner parts A through D are reinforced in accordance with the arrangement of studs in the simulation No. 5.0. Under such conditions, stress values of the corner part A and the corner part B decrease, and stress values of the corner part C and the corner part D increase.

(Simulation No. 5.2, FIG. 12)

The simulation No. 5.2 is a result of the simulation in a case where the corner part A is reinforced based on the method of determining a reinforcement position in accordance with the present embodiment. Under such conditions, as with the case of the simulation No. 5.1, stress values of the corner part A and the corner part B decrease, and stress values of the corner part C and the corner part D increase. However, compared to a case of the simulation No. 5.1 in which four corner parts are reinforced, as the number of reinforcement positions is small, there are advantages in cost and simplification of manufacturing process.

Figure 13:
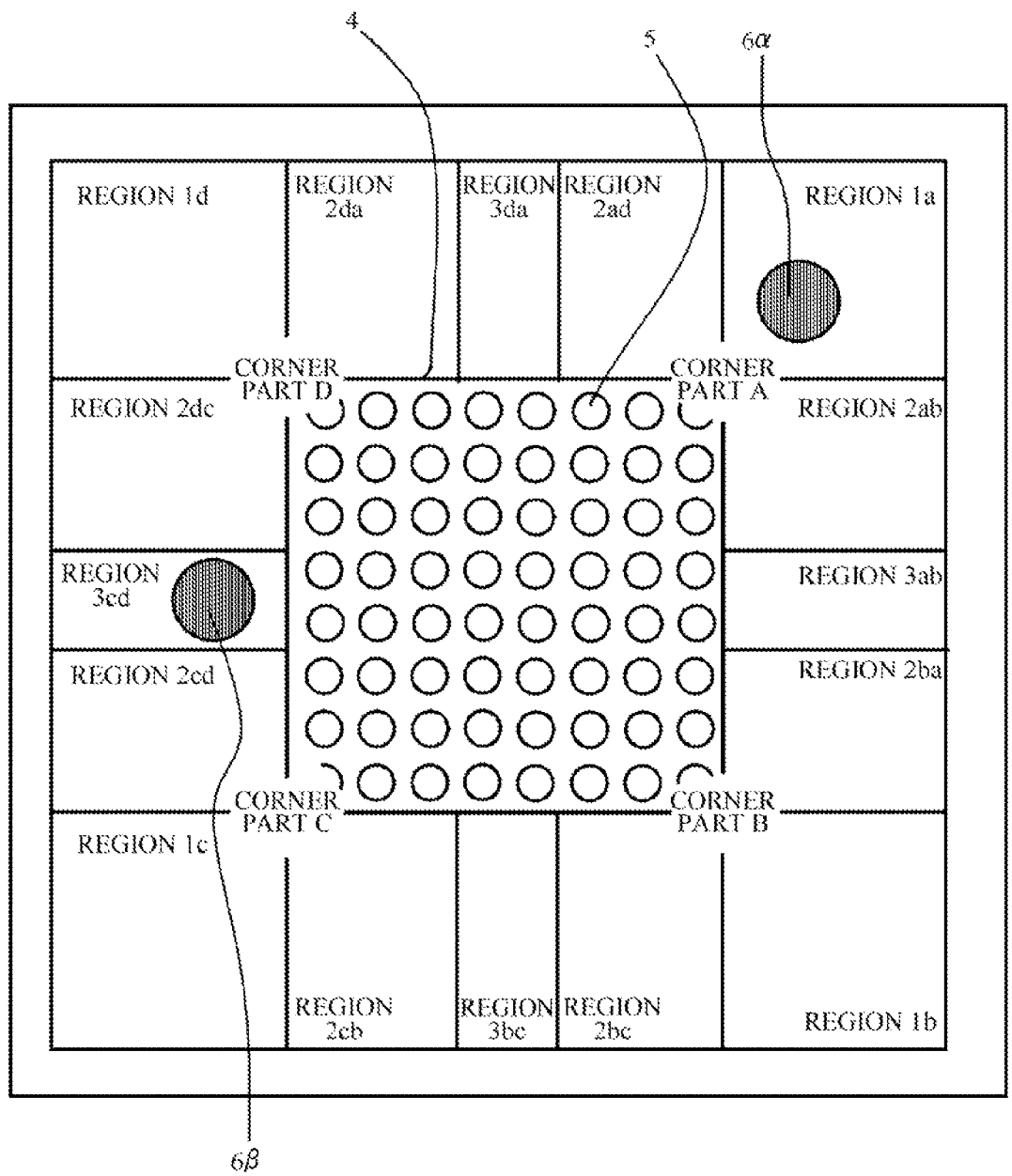
FIG. 13 is an explanatory diagram illustrating an arrangement of studs in a simulation No. 6.0.

(Simulation No. 6.0, FIG. 13)

The simulation No. 6.0 is a case where two studs, that is to say, the stud 6α and the stud 6β are arranged as illustrated in FIG. 13. The stud 6α is located in the region 1a. The stud 6β is located in a region 3cd. This case can be evaluated as a case similar to the simulation No. 5.0. Accordingly, it is considered that the corner part A is to be reinforced. A simulation result in a case where the reinforcement is performed is omitted.

Figure 14:
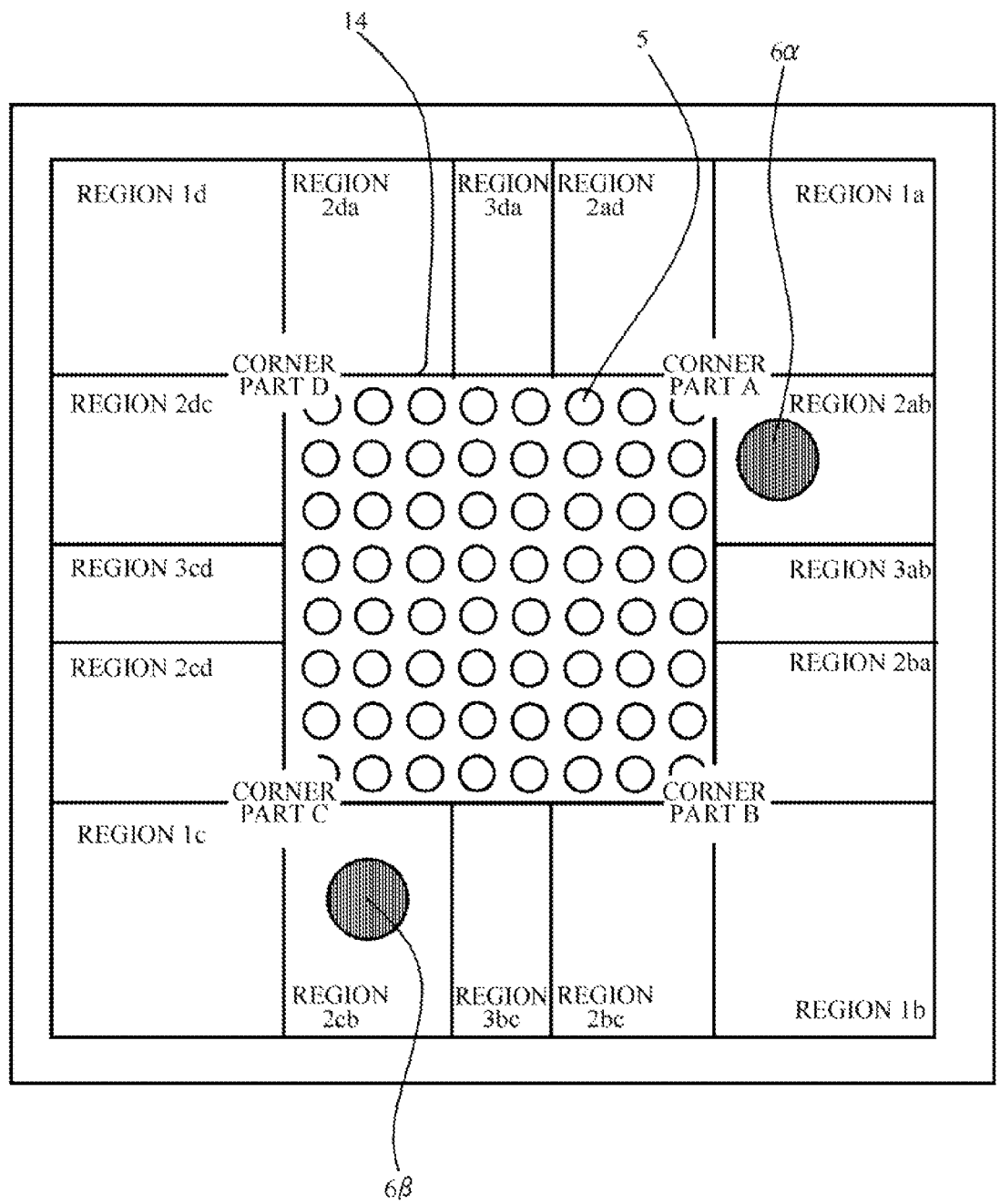
FIG. 14 is an explanatory diagram illustrating an arrangement of studs in a simulation No. 7.0.

(Simulation No. 7.0, FIG. 14)

The simulation No. 7.0 is a case where two studs, that is to say, the stud 6α and the stud 6β are arranged as illustrated in FIG. 14. The stud 6α are located in the region 2ab. The stud 6β are located in a region 2cb. The stress value of the corner part A and the stress value of the corner part C are 106.5 MPa and 107.2 MPa respectively, and high. Accordingly, the corner part A and the corner part C are to be reinforced. A simulation result in a case where the reinforcement is performed is omitted.

Figure 15:
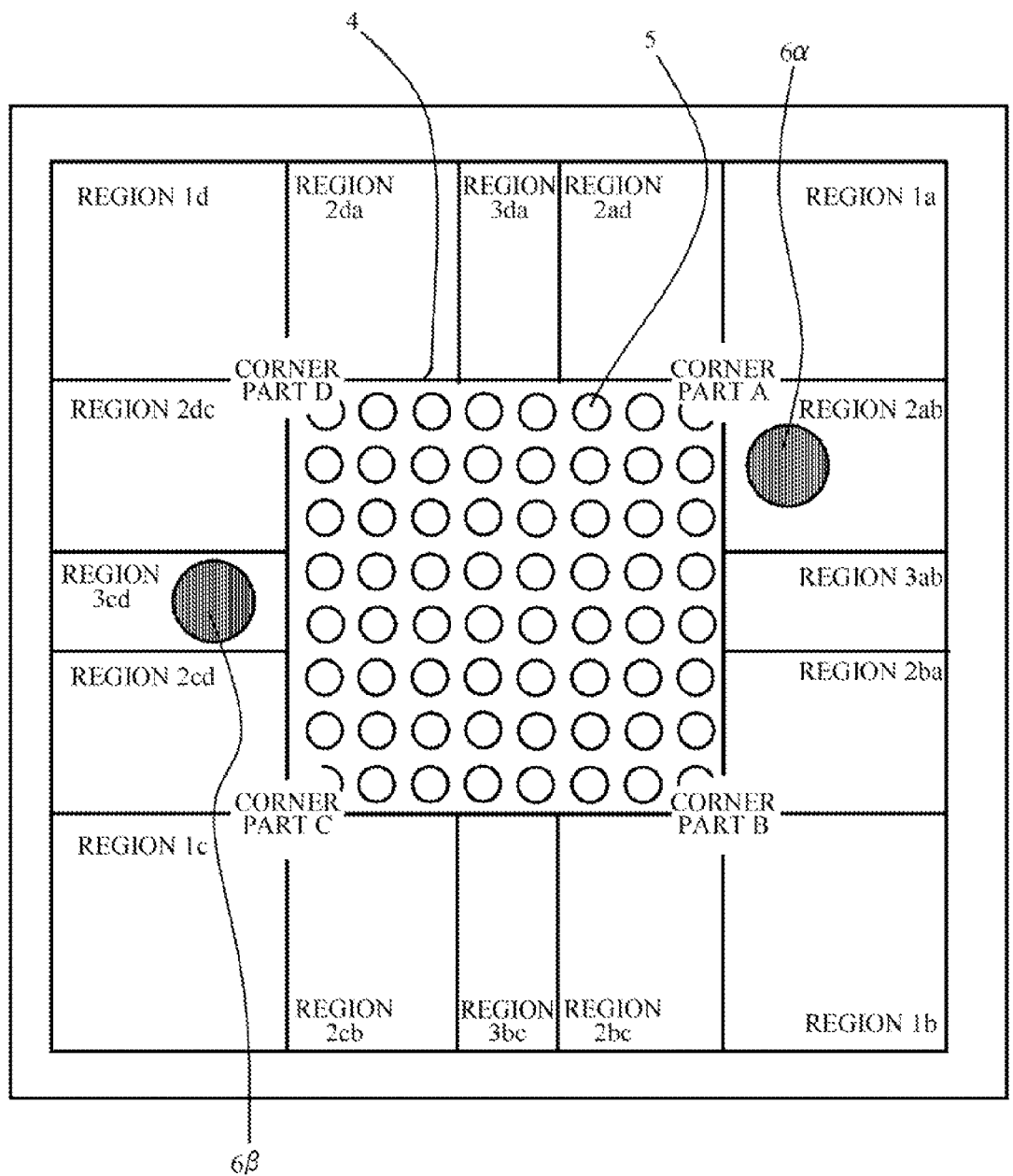
FIG. 15 is an explanatory diagram illustrating an arrangement of studs in a simulation No. 8.0.

(Simulation No. 8.0, FIG. 15)

The simulation No. 8.0 is a case where two studs, that is to say, the stud 6α and the stud 6β are arranged as illustrated in FIG. 15. The stud 6α is located in the region 2ab. The stud 6β is located in the region 3cd. The stress value of the corner part A is 226.2 MPa and high. Accordingly, the corner part A is to be reinforced. A simulation result in a case where the reinforcement is performed is omitted.

Figure 16:
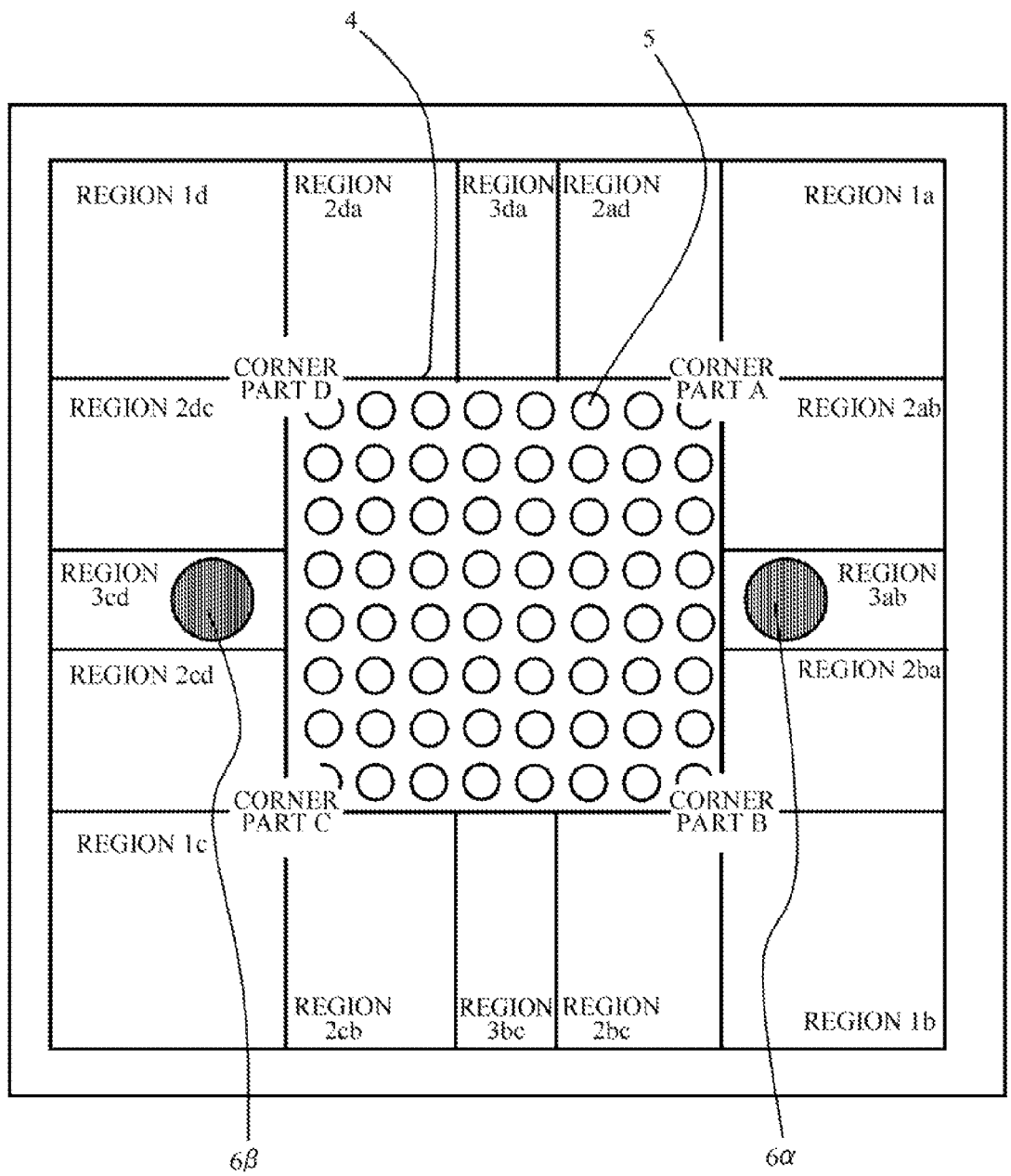
FIG. 16 is an explanatory diagram illustrating an arrangement of studs in a simulation No. 9.0.

(Simulation No. 9.0, FIG. 16)

The simulation No. 9.0 is a case where two studs, that is to say, the stud 6α and the stud 6β are arranged as illustrated in FIG. 16. The stud 6α is located in the region 3ab. The stud 6β is located in the region 3cd. In this case, as a symmetrical state is achieved, a both-ends-supported beam structure is achieved. However, as the stud located at the center of the side receives a strain by multiple bumps 5, it can be evaluated that the stress of the corner part is not generated. Accordingly, in this case, the reinforcement is not necessary.

Figure 17:
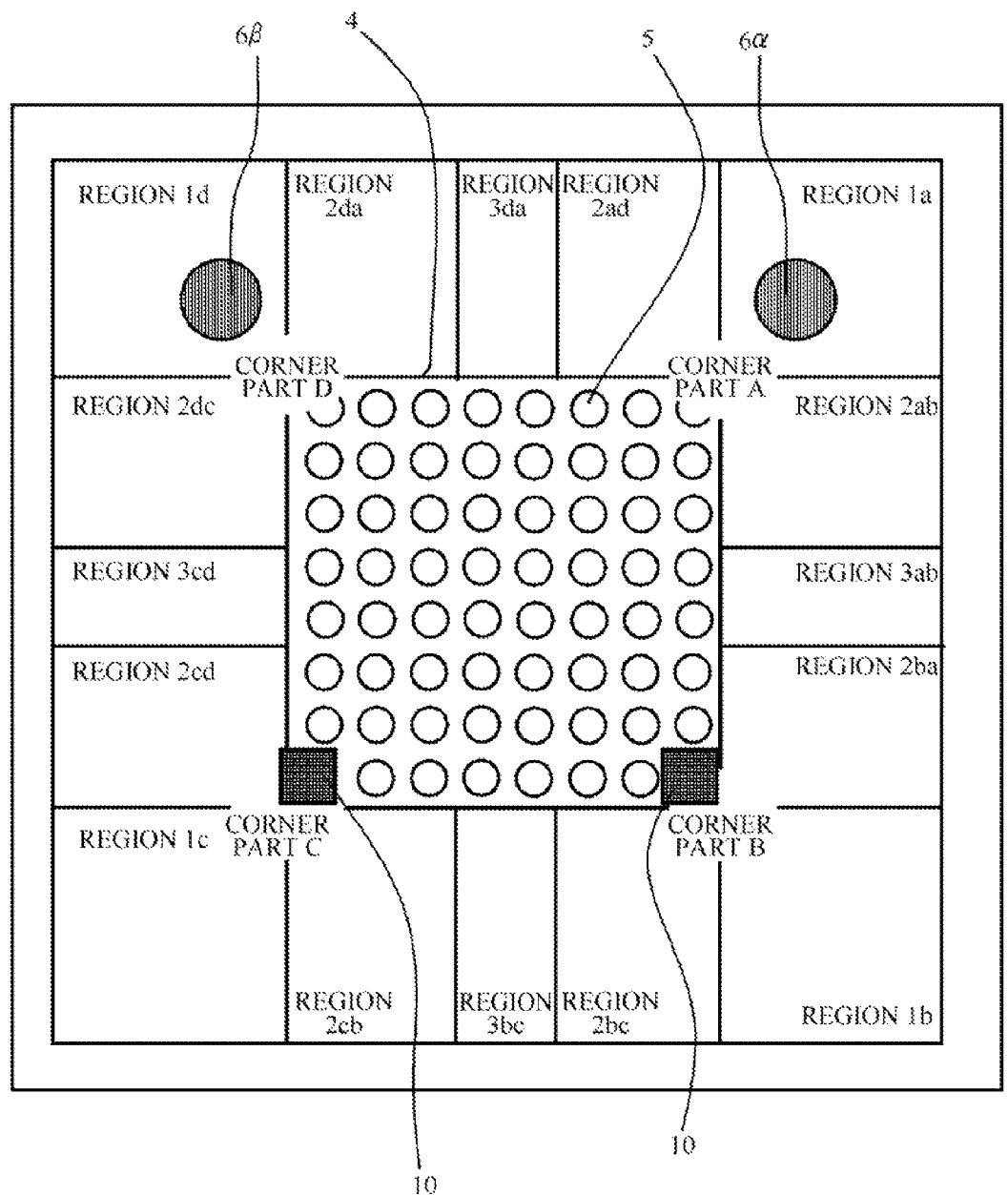
FIG. 17 is an explanatory diagram illustrating a circuit board that is reinforced based on a simulation No. 10.2.

(Simulation No. 10.0, FIG. 17)

The simulation No. 10.0 is a case where two studs, that is to say, the stud 6α and the stud 6β are arranged as illustrated in FIG. 17. The stud 6α is located in the region 1a. The stud 6β is located in a region 1d. When the reinforcement is not performed, that is to say, the reinforcing member 10 is not attached, the stress value of the corner part B and the stress value of the corner part C are 902.1 MPa and 835.5 MPa respectively, and large. In this case, a structure similar to a cantilever is achieved. Accordingly, the stress is concentrated on the corner part B and the corner part C that are located far from studs 6α and 6P.

(Simulation No. 10.1, FIG. 17)

The simulation No. 10.1 is a result of the simulation in a case where corner parts A through D are reinforced in accordance with the arrangement of studs in the simulation No. 10.0. Under such conditions, the stress value of each corner part decrease, and is equalized. Accordingly, it is considered that it is also effective to reinforce corner parts A through D. However, the reinforcement of four corner parts has disadvantages in cost and simplification of manufacturing process.

(Simulation No. 10.2, FIG. 17)

The simulation No. 10.2 is a result of the simulation in a case where the corner part B and the corner part C are reinforced based on the method of determining a reinforcement position in accordance with the present embodiment. Under such conditions, the stress value of each corner part decreases, and stress values are equalized among corner parts. Accordingly, it is expected that the resistance properties to the pressure of and the long term reliability of the substrate assembly 1 are improved. In addition, compared to a case of the simulation No. 10.1 in which four corner parts are reinforced, as the number of reinforcement positions is small, there are advantages in cost and simplification of manufacturing process.

Figure 18:
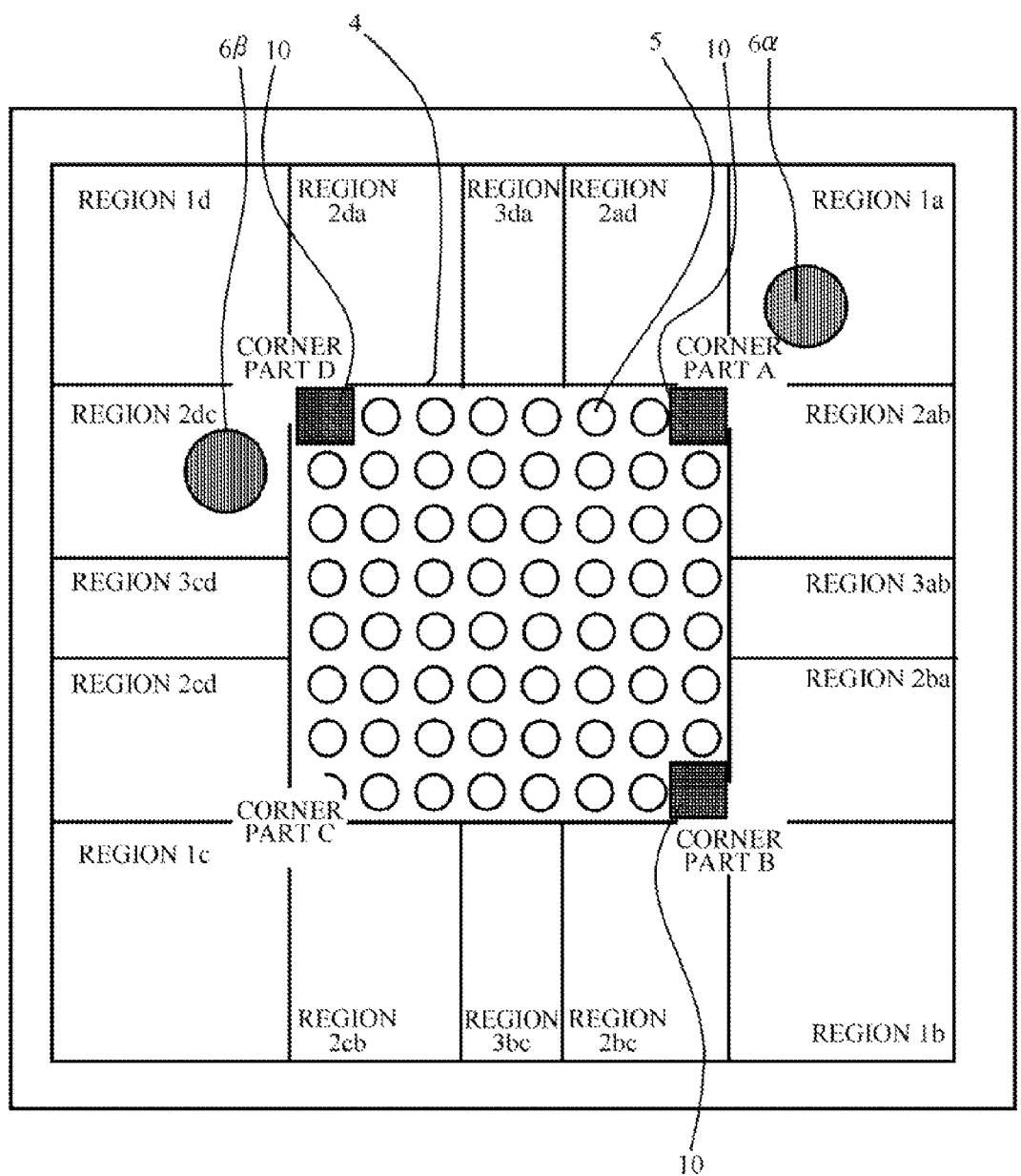
FIG. 18 is an explanatory diagram illustrating a circuit board that is reinforced based on a simulation No. 11.2.

(Simulation No. 11.0, FIG. 18)

The simulation No. 11.0 is a case where two studs, that is to say, the stud 6α and the stud 6β are arranged as illustrated in FIG. 18. The stud 6α is located in the region 1a. The stud 6β is located in a region 2dc. When the reinforcement is not performed, that is to say, the reinforcing member 10 is not attached, only the stress value of the corner part C is small. In this case, as there are two fulcrums, and a both-ends-supported beam structure is achieved, the stress of the corner part A located almost on the line connecting studs 6α and 6β becomes large. At the same time with this, as bumps near the corner part D receive a force by the side, stresses of bumps included in the side become small. However, the stress of the corner part D becomes large. In addition, in the side BC, as the corner part B becomes a structure close to a cantilever structure in which two studs become support points, the stress is concentrated. Accordingly, in this case, it becomes necessary to reinforce the corner part A, the corner part B, and the corner part D. That is to say, the corner part C of which the stress value is smallest is excluded from the reinforcement position.

(Simulation No. 11.1, FIG. 18)

The simulation No. 11.1 is a result of the simulation in a case where corner parts A through D are reinforced in accordance with the arrangement of studs in the simulation No. 11.0. Under such conditions, the stress value of the corner part C is small compared to other corner parts.

(Simulation No. 11.2, FIG. 18)

When the corner part A, the corner part B, and the corner part D are reinforced based on the method of determining a reinforcement position in accordance with the present embodiment, the stress of each corner part decreases, and stress values are equalized among corner parts. That is to say, compared to the simulation No. 11.1 in which four corner parts are reinforced, although the stress value of the corner part C is high, as stress values are equalized, it is expected that the resistance properties to the pressure of and the long term reliability of the substrate assembly 1 are improved. In addition, compared to the case of the simulation No. 11.1 in which four corner parts are reinforced, as the number of reinforcement positions is small, there are advantages in cost and simplification of manufacturing process.

Figure 19:
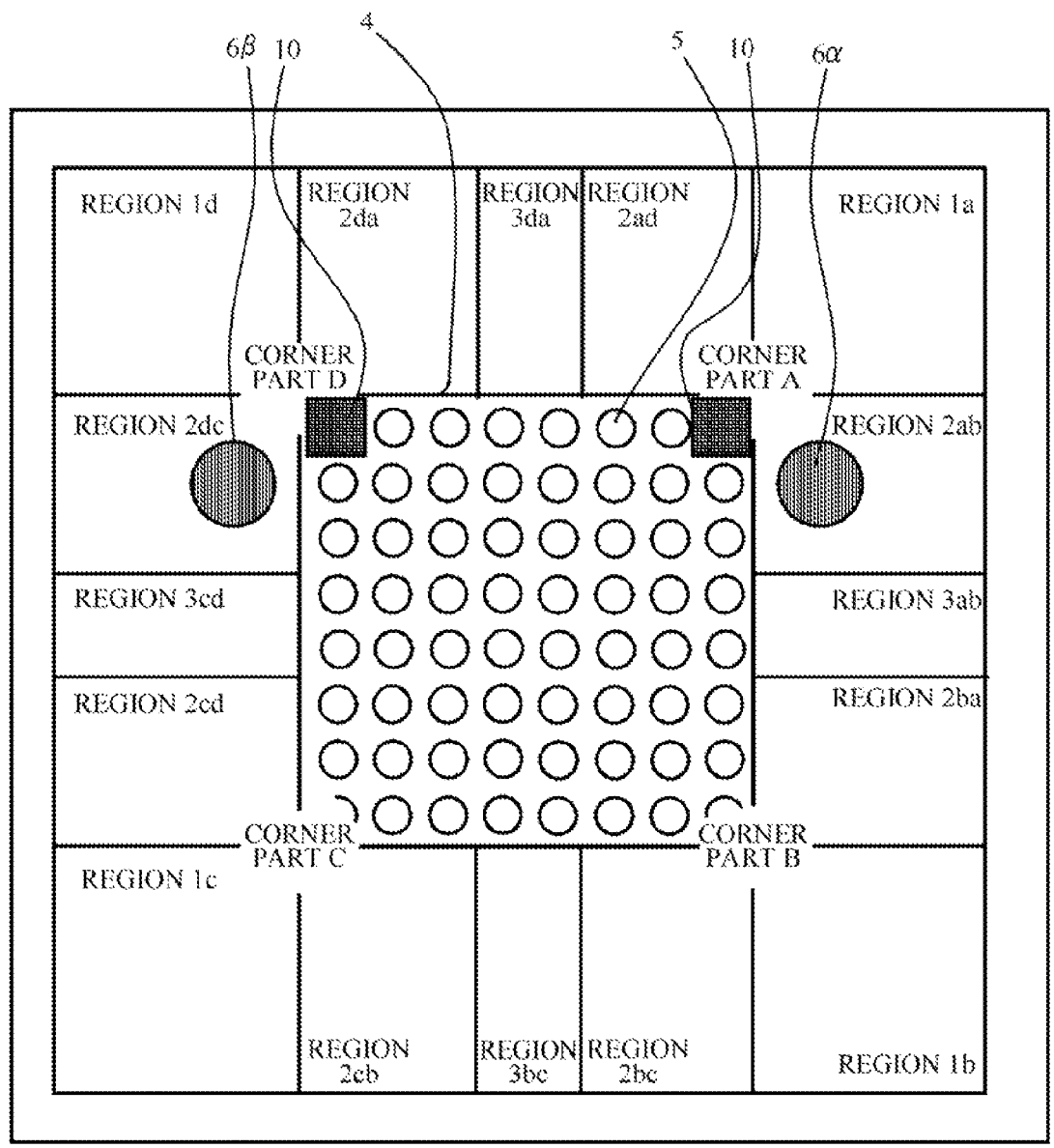
FIG. 19 is an explanatory diagram illustrating a circuit board that is reinforced based on a simulation No. 12.2.

(Simulation No. 12.0, FIG. 19)

The simulation No. 12.0 is a case where two studs, that is to say, the stud 6α and the stud 6β are arranged as illustrated in FIG. 19. The stud 6α is located in the region 2ab. The stud 6β is located in the region 2dc. When the reinforcement is not performed, that is to say, the reinforcing member 10 is not attached, the stress value of the corner part A and the stress value of the corner part D are 374.4 MPa and 360.3 MPa respectively, and large. In this case, a both-ends-supported beam structure is achieved, and stresses of the bumps 5 located on the line connecting the studs 6α and 6β become large. However, as the location of studs is close to the side, the force is received by multiple bumps, the effect on the side portion is small, and stresses of bumps in the corner part A and the corner part D become large.

(Simulation No. 12.1, FIG. 19)

The simulation No. 12.1 is a result of the simulation in a case where corner parts A through D are reinforced in accordance with the arrangement of studs in the simulation No. 12.0. Under such conditions, the stress value of each corner part decreases. However, compared to stress values of the corner part A and the corner part D, stress values of the corner part B and the corner part C are low. That is to say, the variability of stress values is unresolved.

(Simulation No. 12.2, FIG. 19)

The simulation No. 12.2 is a result of the simulation in a case where the corner part A and the corner part D are reinforced based on the method of determining a reinforcement position in accordance with the present embodiment. Under such conditions, the stress of each corner part decreases, and stress values are equalized among corner parts. That is to say, compared to the simulation No. 12.1 in which four corner parts are reinforced, although stress values of the corner part B and the corner part C are high, as stress values are equalized, it is expected that the resistance properties to the pressure of and the long term reliability of the substrate assembly 1 are improved.

Figure 20:
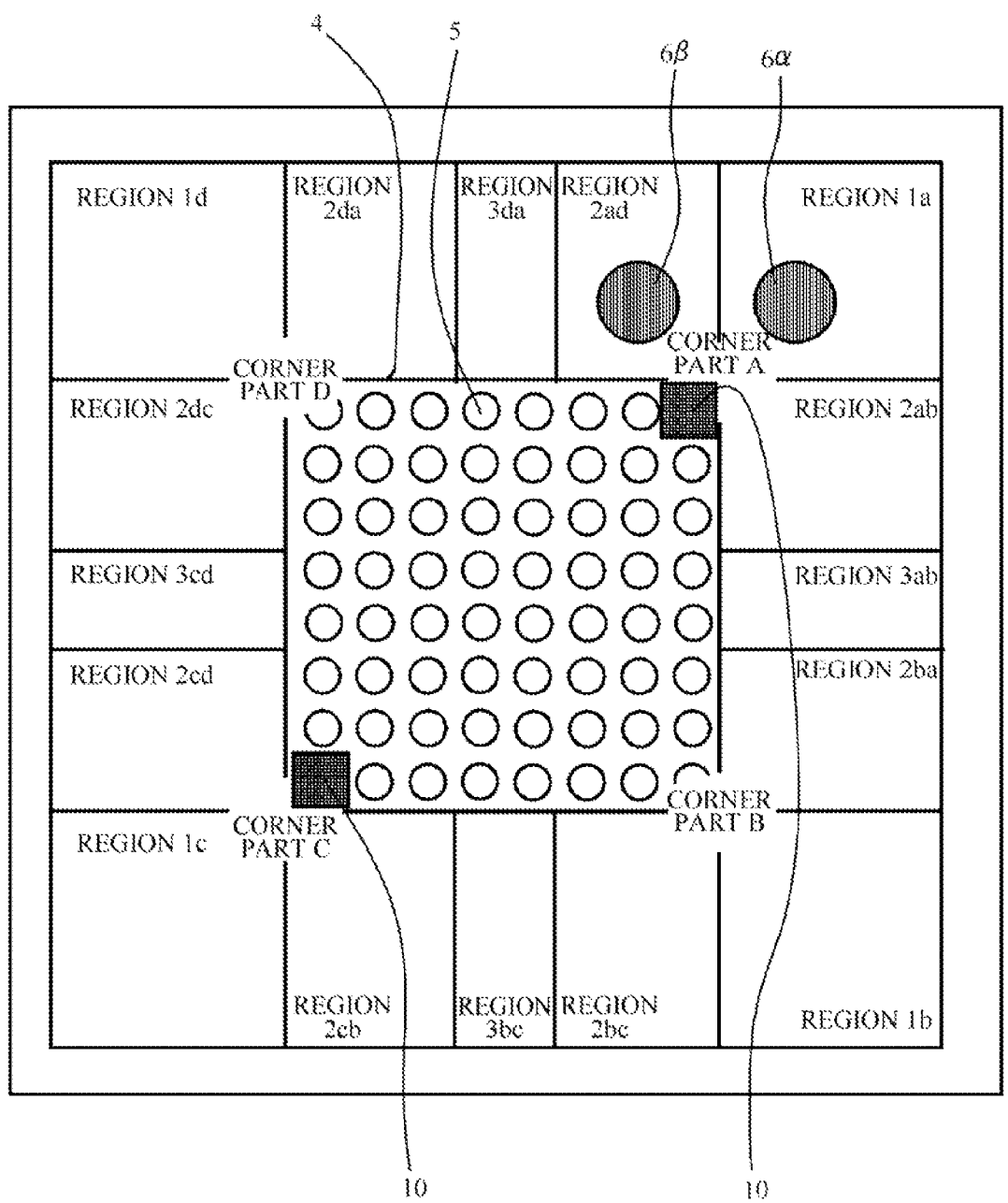
FIG. 20 is an explanatory diagram illustrating a circuit board that is reinforced based on a simulation No. 13.2.

(Simulation No. 13.0, FIG. 20)

The simulation No. 13.0 is a case where two studs, that is to say the stud 6α and the stud 6β are arranged as illustrated in FIG. 20. The stud 6α is located in the region 1a. The stud 6β is located in a region 2ad. When the reinforcement is not performed, that is to say, the reinforcing member 10 is not attached, the stress value of the corner part A and the stress value of the corner part C are 1287.0 MPa and 801.4 MPa respectively, and large. Thus, it is considered that it is necessary to reinforce the corner part A and the corner part C.

(Simulation No. 13.1, FIG. 20)

The simulation No. 13.1 is a result of the simulation in a case where corner parts A through D are reinforced in accordance with the arrangement of studs in the simulation No. 13.0. Under such conditions, the stress value of each corner part decreases.

(Simulation No. 13.2, FIG. 20)

The simulation No. 13.2 is a result of the simulation in a case where the corner part A and the corner part C are reinforced based on a design principle of the present embodiment. Under such conditions, when corner parts A and C are reinforced, the stress value of each corner part decreases. Especially, stress values of the corner part A and the corner part C of which stress values were large decrease more than a case of the simulation No. 13.1, and in addition, this is evaluated in the aspects of the equalization of stress values.

Figure 21:
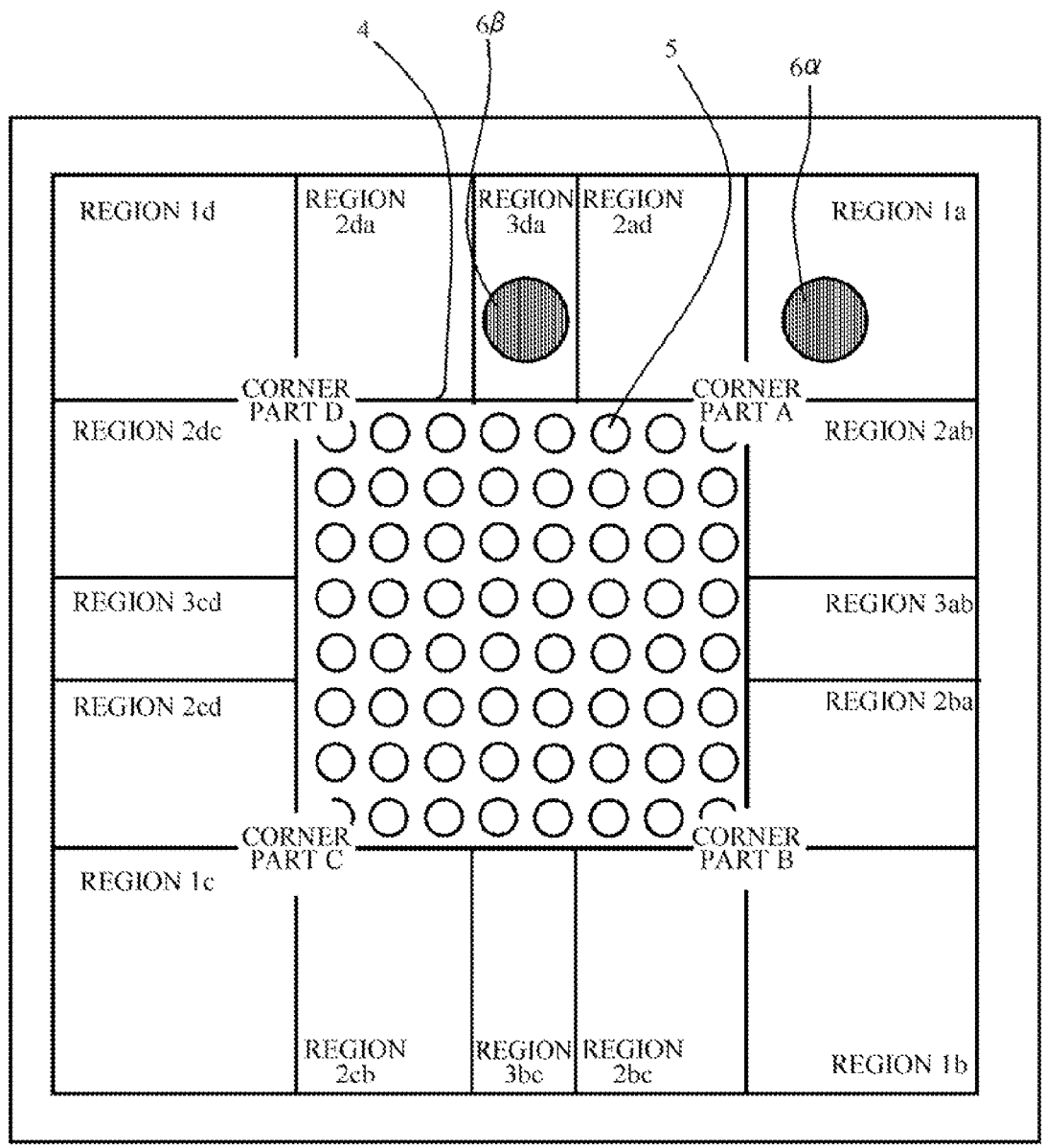
FIG. 21 is an explanatory diagram illustrating an arrangement of studs in a simulation No. 14.0.

(Simulation No. 14.0, FIG. 21)

The simulation No. 14.0 is a case where two studs, that is to say, the stud 6α and the stud 6β are arranged as illustrated in FIG. 21. The stud 6α is located in the region 1a. The stud 6β is located in a region 3da. The stress value of the corner part A and the stress value of the corner part C are 830.5 MPa and 951.7 MPa respectively, and high. Accordingly, it is considered that the corner part A and the corner part C are to be reinforced. A simulation result in a case where the reinforcement is performed is omitted.

Figure 22:
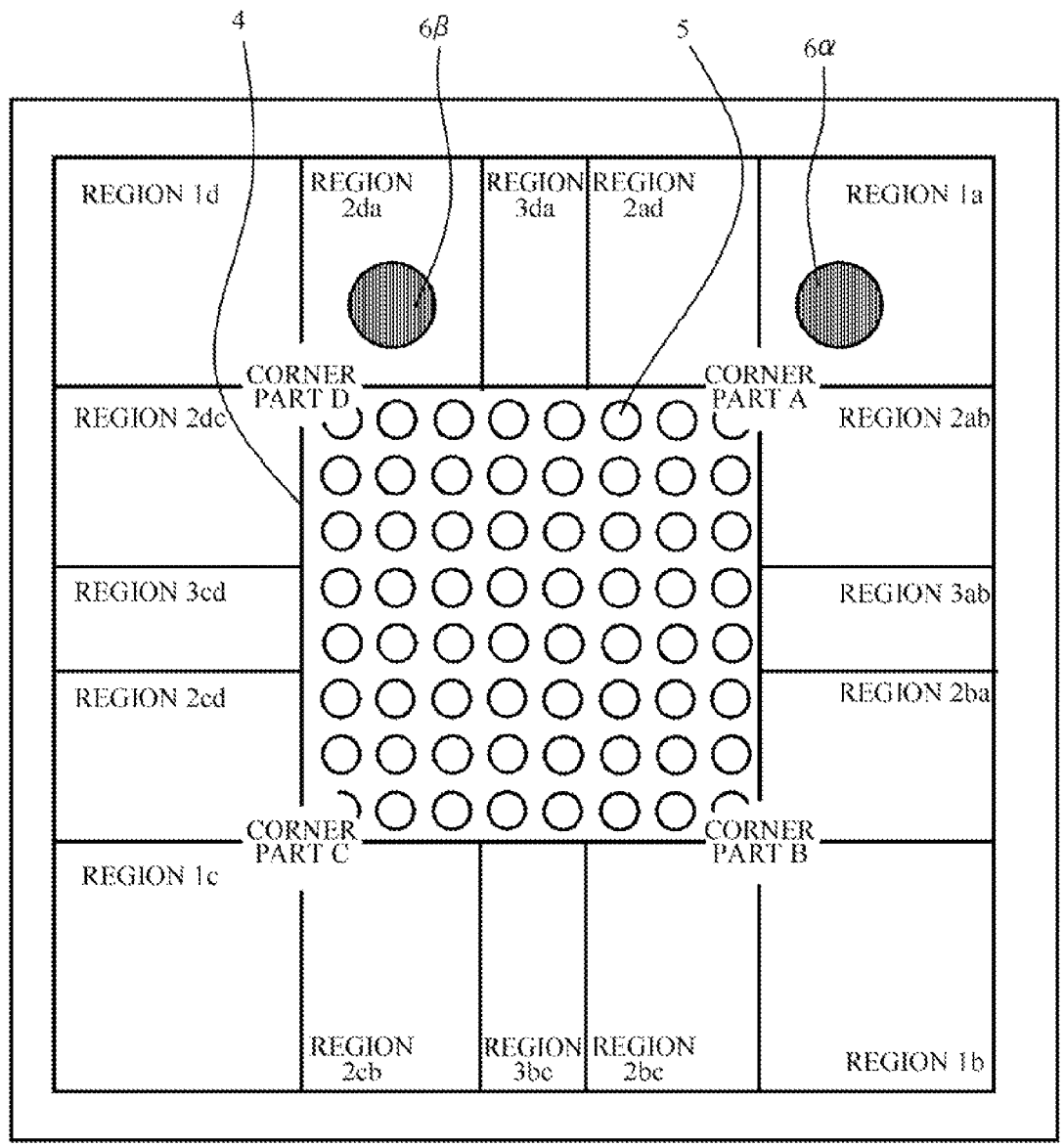
FIG. 22 is an explanatory diagram illustrating an arrangement of studs in a simulation No. 15.0.

(Simulation No. 15.0, FIG. 22)

The simulation No. 15.0 is a case where two studs, that is to say, the stud 6α and the stud 6β are arranged as illustrated in FIG. 22. The stud 6α is located in the region 1a. The stud 6β is located in a region 2da. The stress value of the corner part A and the stress value of the corner part C are 756.7 MPa and 812.1 MPa respectively, and high. Accordingly, the corner part A and the corner part C are to be reinforced. A simulation result in a case where the reinforcement is performed is omitted.

Figure 23:
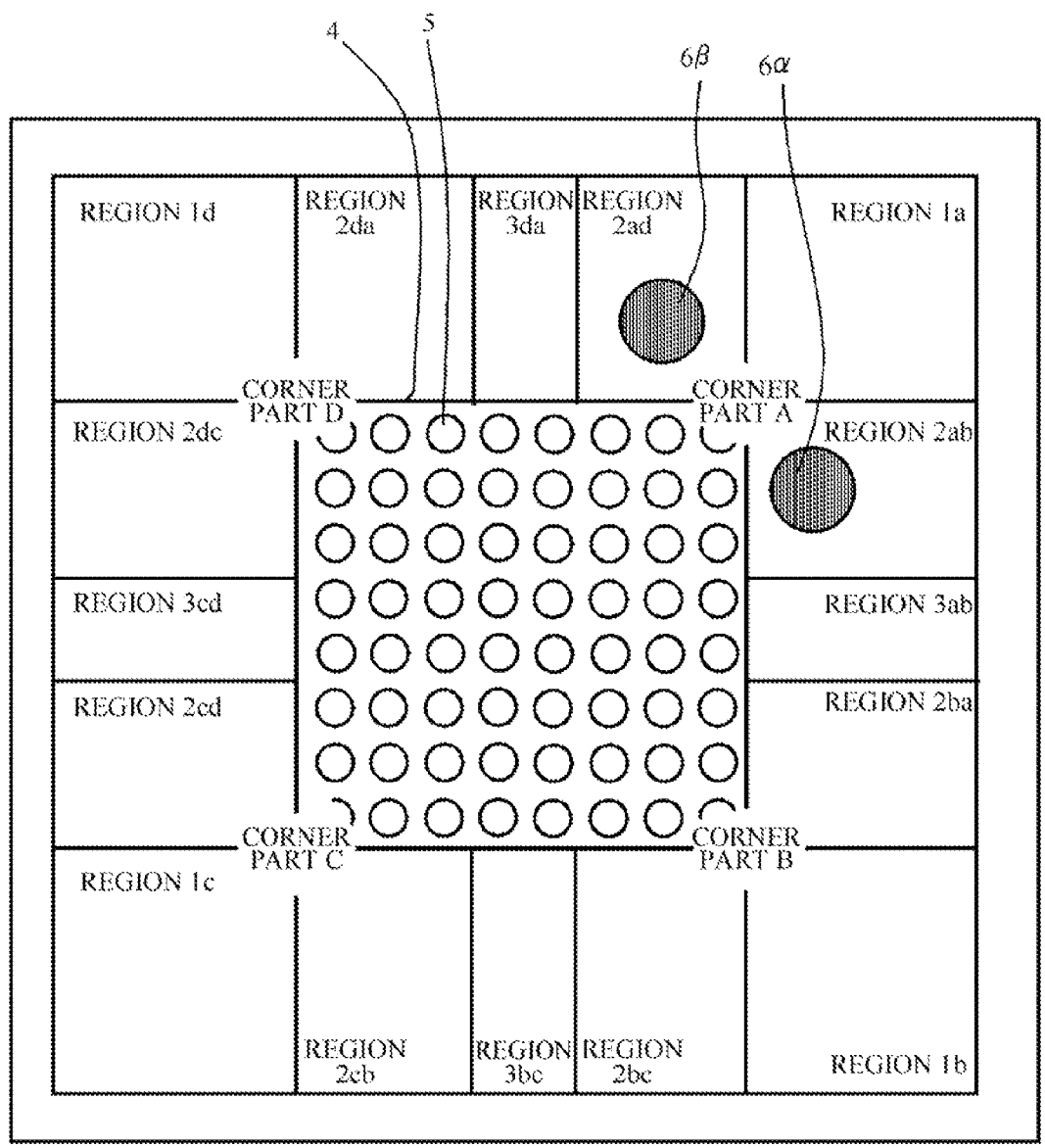
FIG. 23 is an explanatory diagram illustrating an arrangement of studs in a simulation No. 16.0.

(Simulation No. 16.0, FIG. 23)

The simulation No. 16.0 is a case where two studs, that is to say, the stud 6α and the stud 6β are arranged as illustrated in FIG. 23. The stud 6α is located in the region 2ab. The stud 6β is located in the region 2ad. The stress value of the corner part A and the stress value of the corner part C are 2076.0 MPa and 1088.0 MPa respectively, and high. In this case, as there are two fulcrums and a both-ends-supported beam structure is achieved, the stress of the corner part A located on the line connecting studs becomes large. In addition, as the deformation around the electronic component 4 generates the deformation close to the cantilever structure in which the position near the corner part A is fixed, the stress of the corner part C located far from the fixed position becomes large. Accordingly, the corner part A and the corner part C are to be reinforced. A simulation result in a case where the reinforcement is performed is omitted.

Figure 24:
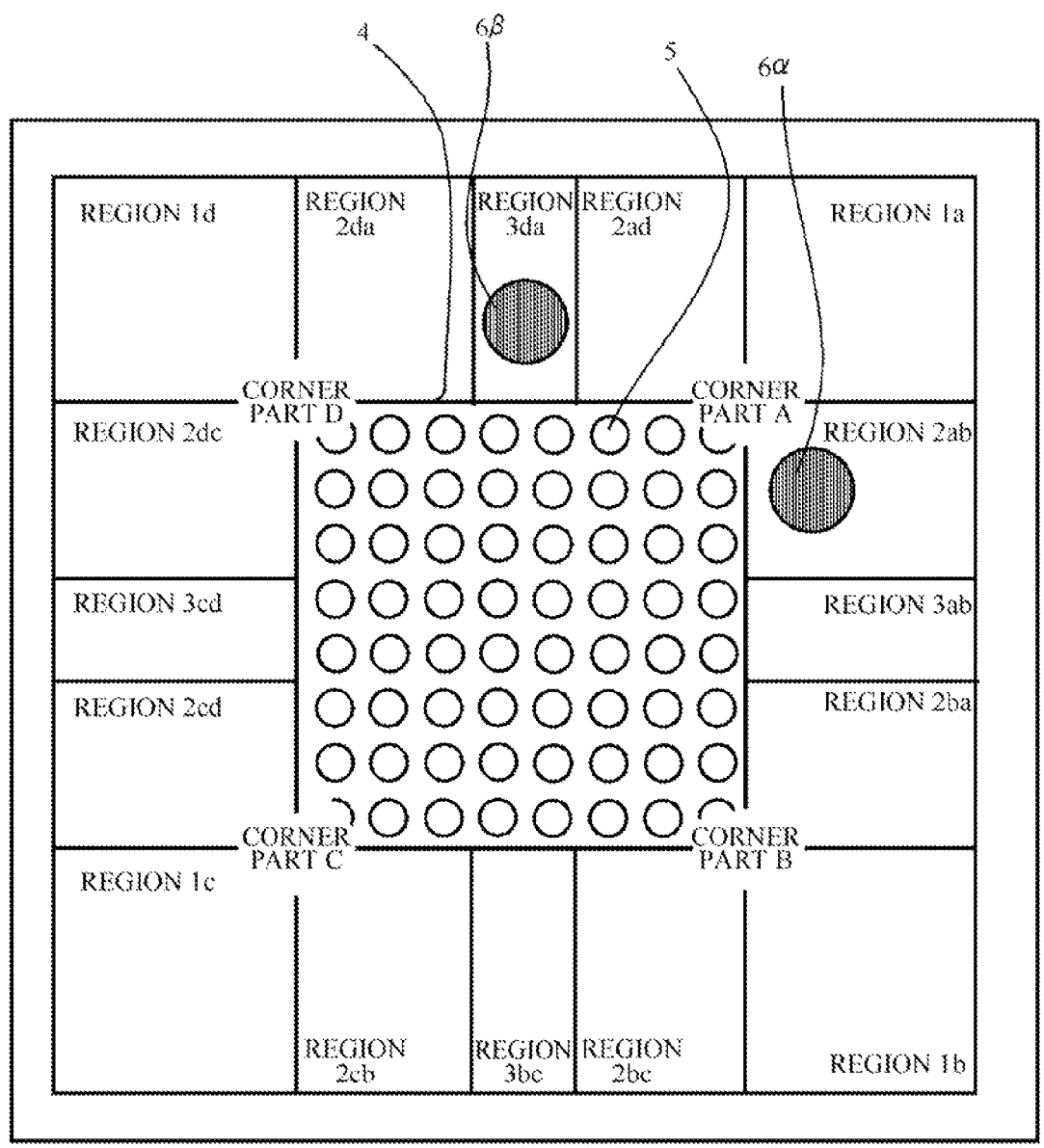
FIG. 24 is an explanatory diagram illustrating an arrangement of studs in a simulation No. 17.0.

(Simulation No. 17.0, FIG. 24)

The simulation No. 17.0 is a case where two studs, that is to say, the stud 6α and the stud 6β are arranged as illustrated in FIG. 24. The stud 6α is located in the region 2ab. The stud 6β is located in the region 3da. The stress value of the corner part A and the stress value of the corner part C are 1069.0 MPa and 672.5 MPa respectively, and high. Accordingly, the corner part A and the corner part C are to be reinforced. A simulation result in a case where the reinforcement is performed is omitted.

Figure 25:
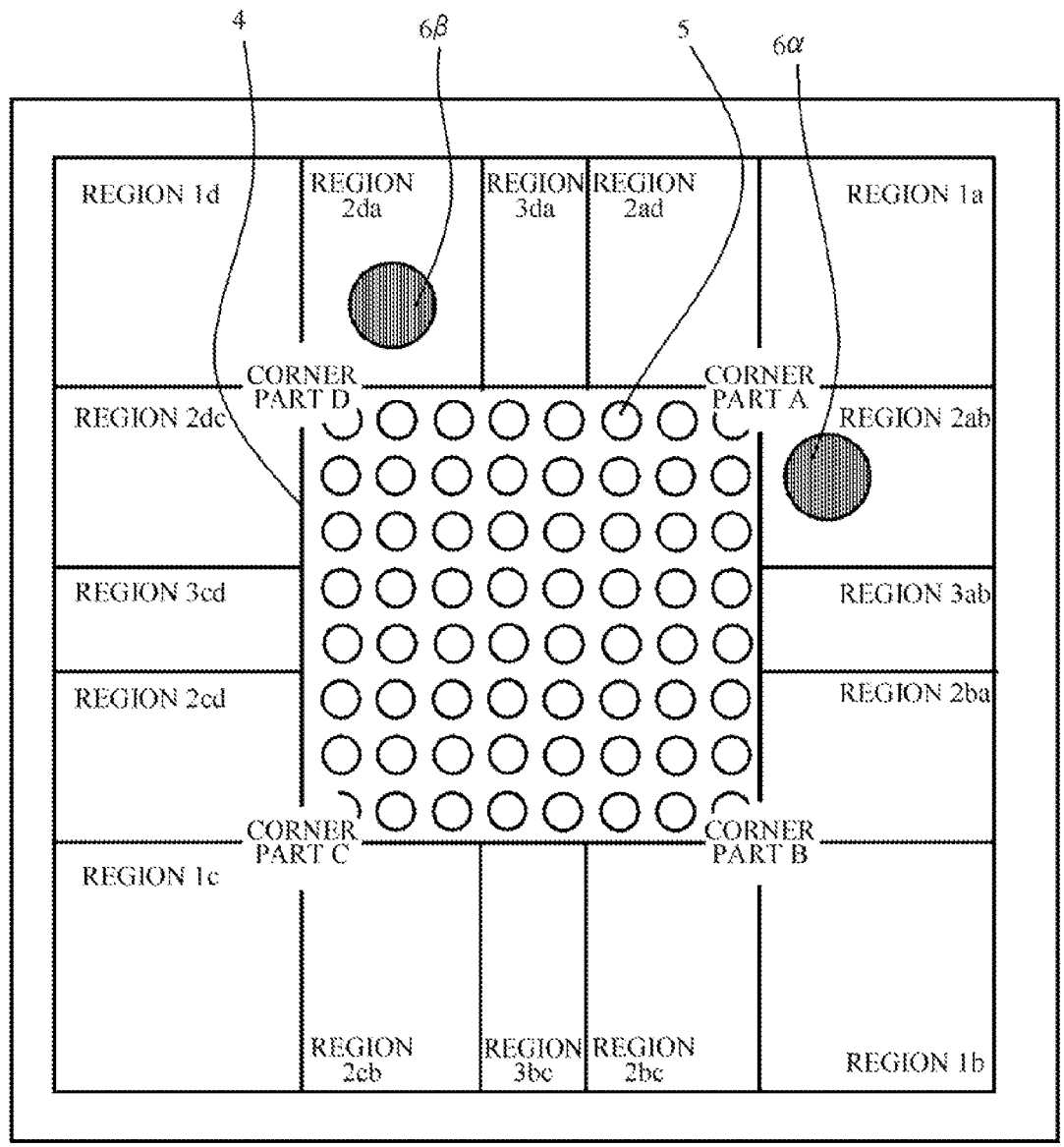
FIG. 25 is an explanatory diagram illustrating an arrangement of studs in a simulation No. 18.0.

(Simulation No. 18.0, FIG. 25)

The simulation No. 18.0 is a case where two studs, that is to say, the stud 6α and the stud 6β are arranged as illustrated in FIG. 25. The stud 6α is located in the region 2ab. The stud 6β is located in the region 2da. The stress value of the corner part A and the stress value of the corner part C are 1127.0 MPa and 440.2 MPa respectively, and high. Accordingly, the corner part A and the corner part C are to be reinforced. A simulation result in a case where the reinforcement is performed is omitted.

Figure 26:
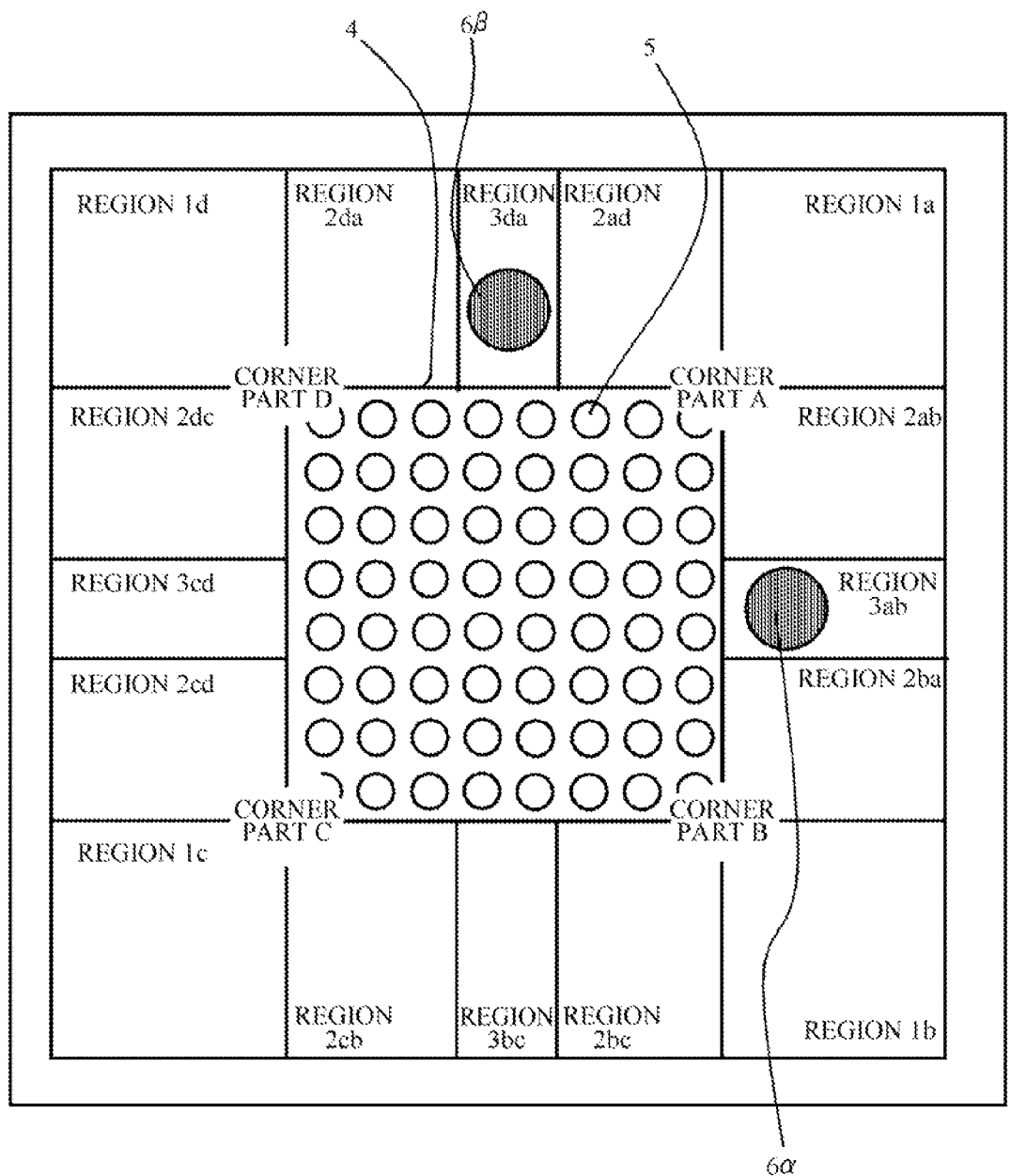
FIG. 26 is an explanatory diagram illustrating an arrangement of studs in a simulation No. 19.0.

(Simulation No. 19.0, FIG. 26)

The simulation No. 19.0 is a case where two studs, that is to say, the stud 6α and the stud 6β are arranged as illustrated in FIG. 26. The stud 6α is located in the region 3ab. The stud 6β is located in the region 3da. The stress value of the corner part A and the stress value of the corner part C are 377.7 MPa and 471.8 MPa respectively, and high. Accordingly, the corner part A and the corner part C are to be reinforced. A simulation result in a case where the reinforcement is performed is omitted.

Figure 27:
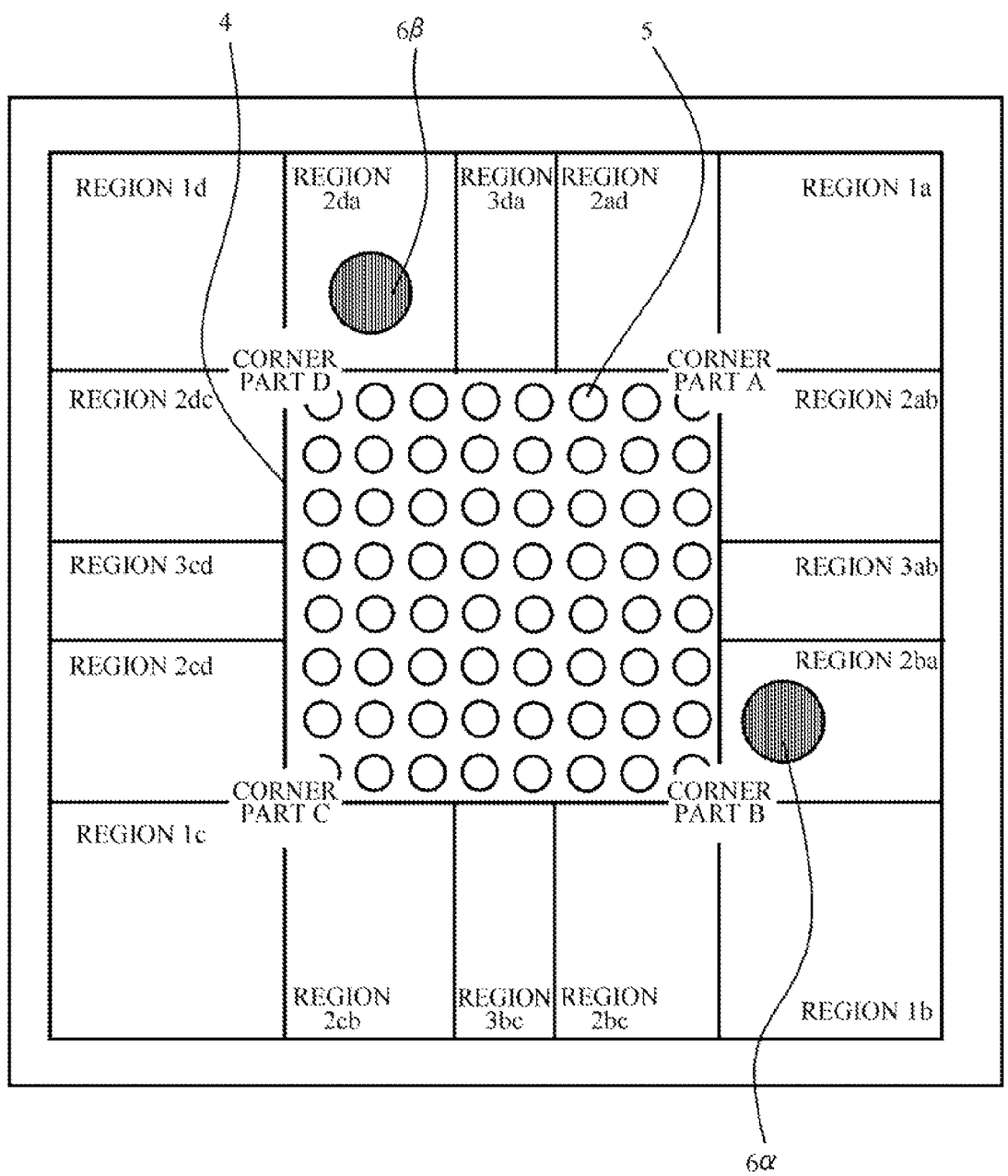
FIG. 27 is an explanatory diagram illustrating an arrangement of studs in a simulation No. 20.0.

(Simulation No. 20.0, FIG. 27)

The simulation No. 20.0 is a case where two studs, that is to say, the stud 6α and the stud 6β are arranged as illustrated in FIG. 27. The stud 6α is located in the region 2ba. The stud 6β is located in the region 2da. The stress value of the corner part A and the stress value of the corner part C are 161.4 MPa and 217.9 MPa respectively, and high. Accordingly, the corner part A and the corner part C are to be reinforced. A simulation result in a case where the reinforcement is performed is omitted.

As described above, in accordance with the various sorts of arrangements of studs, it is possible to determine the position of the reinforcing member which becomes a minimum countermeasure to reduce the warpage. The substrate assembly to which the reinforcing member is provided as described above includes the circuit board 2 on which the electronic component 4 is mounted by the bumps 5 arranged in a rectangular shape on a front surface. In addition, the studs 6 that are located in the periphery of the electronic component 4 and fix the circuit board 2 to the chassis are included. Furthermore, the reinforcing member 10 attached to the position that is located in the back surface of the circuit board 2 and corresponds to the corner part A through the corner part D of the electronic component 4 are included. Here, as is clear from Table 2, the reinforcing member 10 is provided to the position corresponding to the corner part other than the corner part of which the stress generated when the pressure is applied to the electronic component 4 from the back side of the circuit board 2 is smallest. In other words, the reinforcing member 10 is not provided to at least the corner part of which the stress is smallest.

By determining the reinforcement position of the reinforcing member 10 with the above described process, compared to a case where the reinforcing member is provided to all corner parts of the electronic component 4, it is possible to determine which reinforcing member 10 is removed without increasing the maximum value of the stress applied to the corner part of which the reinforcing member 10 is removed. In addition, when the center position of the electronic component 4 is located on the line connecting the stud 6 and the reinforcing member 10, it is possible to equalize stress values of corner parts by excluding the corner part of which the stress value is smallest from the reinforcement position.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A method of determining a reinforcement position of a circuit board comprising:
    setting a numerical model of a circuit board in which an electronic component is mounted in a front surface by bumps, and a reinforcing member is attached to a position corresponding to a bump located in a corner part of the electronic component in a back surface;
    incorporating information about a stud that is located in a periphery of the electronic component and fixes the circuit board to a chassis of the electronic component;
    performing a simulation for obtaining values of stresses generated in bumps of corner parts when a force is applied to the electronic component from a back side of the circuit board; and
    determining an arrangement of the reinforcing member in accordance with a position of the stud based on the values of stresses obtained by the simulation.

2. The method of determining a reinforcement position of a circuit board according to claim 1, wherein
    the simulation includes:
        obtaining first stress values of the corner parts by using a numerical model in which a reinforcing member is attached to all the corner parts; and
        obtaining second stress values of the corner parts by using a numerical model in which a reinforcing member of a part of the corner parts is removed and a reinforcing member of a part of the corner parts remains attached, and
    the method of determining a reinforcement position of a circuit board further includes:
        comparing a maximum value of the first stress values and a second stress value exhibited in a corner part exhibiting the maximum value, and selecting, in a case where the second stress value exhibited in the corner part exhibiting the maximum value is equal to or smaller than the maximum value, the arrangement of the reinforcing member whereby the second stress value is exhibited.

3. The method of determining a reinforcement position of a circuit board according to claim 1, wherein
    the simulation includes:
        obtaining first stress values of the corner parts by using a numerical model in which reinforcing members are attached to four corner parts that are entire corner parts of the electronic component;
        calculating second stress values of the corner parts with respect to each of three numerical models in which a maximum stress reinforcing member located in a position corresponding to a corner part exhibiting a maximum value of the first stress values remains attached and arbitrary one reinforcing member other than the maximum stress reinforcing member is removed by using the three numerical models, comparing the maximum value of the first stress values at that point with a second stress value exhibited in the corner part exhibiting the maximum value at that point, and replacing the first stress value with the second stress value when the second stress value is equal to or smaller than the maximum value;
        obtaining third stress values of the corner parts with respect to each of three numerical models in which a maximum stress reinforcing member located in a position corresponding to a corner part exhibiting a maximum value of the first stress values remains attached and arbitrary two reinforcing members other than the maximum stress reinforcing member are removed by using the three numerical models, comparing the maximum value of the first stress values at that time with a third stress value exhibited in the corner part exhibiting the maximum value at that point, and replacing the first stress value with the third stress value when the third stress value is equal to or smaller than the maximum value; and
        obtaining fourth stress values of the corner parts with respect to a numerical model in which a maximum stress reinforcing member located in a position corresponding to a corner part exhibiting a maximum value of the first stress values remains attached and three reinforcing members other than the maximum stress reinforcing member are removed by using the numerical model, comparing the maximum value of the first stress values at that time with a fourth stress value exhibited in the corner part exhibiting the maximum value at that point, and replacing the first stress value with the fourth stress value when the fourth stress value is equal to or smaller than the maximum value, and
    the method of determining a reinforcement position of a circuit board further includes:
        selecting the arrangement of the reinforcing member whereby the first stress value is replaced when the simulation is finished.

* * * * *